United States Patent [19]

Kamei et al.

[11] Patent Number: 6,143,413
[45] Date of Patent: Nov. 7, 2000

[54] MAGNETIC RECORDING MEDIUM AND HEAD CLEANING TAPE

[75] Inventors: Takahiro Kamei; Noriyuki Kishii; Atsuko Suzuki; Haruo Watanabe; Ken Kobayashi; Kenichi Kurihara, all of Kanagawa; Takahiro Miyazaki, Miyagi, all of Japan

[73] Assignee: Sony Corporation, Tokyo, Japan

[21] Appl. No.: 08/921,220

[22] Filed: Aug. 27, 1997

[30] Foreign Application Priority Data

| Aug. 30, 1996 | [JP] | Japan | 8-231058 |
| Sep. 3, 1996 | [JP] | Japan | 8-233331 |
| Nov. 1, 1996 | [JP] | Japan | 8-292094 |
| Nov. 6, 1996 | [JP] | Japan | 8-294168 |
| Jan. 13, 1997 | [JP] | Japan | 9-003994 |

[51] Int. Cl.$^7$ .................................................. G11B 05/708
[52] U.S. Cl. .................................. 428/408; 428/694 BP; 428/694 TC; 428/694 BB; 428/694 TB; 428/900
[58] Field of Search ................. 428/694 BP, 694 TP, 428/694 BN, 900, 694 TC, 694 BB, 694 TB, 408

[56] References Cited

U.S. PATENT DOCUMENTS

| 4,464,279 | 8/1984 | Arai | 252/62.54 |
| 4,550,054 | 10/1985 | Yamauchi et al. | 428/328 |
| 4,983,455 | 1/1991 | Wakai et al. | 428/336 |
| 5,094,701 | 3/1992 | Norman et al. | 148/23 |

FOREIGN PATENT DOCUMENTS 0 507 074 A1  2/1992  European Pat. Off. .

*Primary Examiner*—Stevan A. Resan
*Attorney, Agent, or Firm*—Hill & Simpson

[57] ABSTRACT

This invention provides a magnetic recording medium which, even when the friction time is prolonged or the scan speed is increased to achieve a long time recording, will leave no burnt matters onto a magnetic head, reduce spacing loss, and prevent an increase in error rate. This invention also provides a cleaning tape which, without causing any wear and damage of a magnetic head, will remove the head of burnt matters adherent thereto.

They are actually a magnetic recording medium and cleaning tape which hold an antiseize agent containing a compound with a pyridine skeleton and two or more ligand sites. Alternatively, they are a magnetic recording medium and cleaning tape which hold an antiseize agent containing a diketone compound. The antiseize agent may contain a titanium coupling agent, carboxylic acid, and phosphor-containing compound, in addition to the above compound.

14 Claims, 2 Drawing Sheets

MAGNETIC RECORDING MEDIUM AND HEAD CLEANING TAPE

BACKGROUND OF THE INVENTION

1. Field of the Invention

This invention relates to a magnetic recording medium capable of preventing adherence of matters to a magnetic head, and a cleaning tape for removing the magnetic head of matters adherent thereto.

2. Description of the Prior Art

In the field of magnetic recording, a demand for long-time recording is intense to meet the high capacity recording especially in the field of data cartridges for hard disk back-up and digital video recorders. The long time recording is achieved after the thickness of a tape has been reduced or the cassette shell has been modified. so that the effective length of tape is increased.

The data cartridge generally achieves recording/replay by the helical scan method. With the helical scan method, however, the magnetic surface of a tape runs so fast past a magnetic head that the head becomes hot while pressed against the running tape, and tends to be inflicted with burned matters thereupon.

If the contact time is lengthened or the scan speed is increased, to achieve long-time recording, it will further enhance the generation/adherence of burned matters onto the surface of the magnetic head.

Particularly, under a hot, humid atmosphere, a magnetic tape presents a reduced abrasion, and thus metal oxides generated tribologically harden by heating, and adhere and accumulate onto the surface of the head without being abraded by the tape. The accumulated burnt matters form a gap (spacing) between the magnetic tape and head, thereby interfering with the communication of signals between them.

Currently, a supercalender treatment is applied to a tape to improve its surface performance, to further increase its electromagnetic conversion and to reduce its spacing loss. This treatment, however, rather enhances the friction between a magnetic tape and magnetic head, which will lead to the increased generation/adherence of burnt matters on the surface of the magnetic head.

To inhibit the generation/adherence of burnt matters onto the magnetic head, a number of trials have been made: a reducing agent such as a derivative from ascorbic acid is added to a magnetic tape as an antioxidant, and a lubricant is added to a tape at a concentration higher than normal to further reduce the surface friction. However, once burnt matters have been generated on the surface of a tape, they stick so firmly thereupon that they are scarcely responsive to those treatments.

Alternatively, a number of methods have been developed to clean a magnetic head of adhered burnt matters: a cleaning tape is introduced to abrade the head physically, and a cleaning roll mechanism is implemented to abrade the magnetic head continuously. For example, Japanese Unexamined Patent Publication No.57-208626 proposes a cleaning tape which is produced after a powder of $\alpha$-$Al_2O_3$ or $Cr_2O_3$ having a Morse hardness of 8 or more has been applied as an abrading agent together with a bonding resin onto a polyester film base.

The abrading particles used for such physical abrasion has such a high hardness that, while being excellent in their abrading activity, they often wear and damage the magnetic head itself while they are cleaning the head of burnt matters.

The magnetic head used for recording/replay of 8 mm videotapes or digital videotapes has a gap as small as 0.3 $\mu$m or less, and on that gap a tape runs past at a very high speed. Such magnetic head so readily suffer from mechanical impacts that it, if pressed hard against the abrading particles described above, will be worn away or damaged easily.

As a remedy for this problem, Japanese Examined Patent Publication No. 8-00169 5 proposes a method wherein the size of abrading particles is so adjusted as to reduce the wear of a magnetic head. However, the wear of a magnetic head is unavoidable even when the size of abrading particles is adjusted as long as the particles are made of $\alpha$-$Al_2O_3$ or $Cr_2O_3$ or substance high in hardness.

To remove or reduce burnt matters adherent onto a magnetic head, various treatments have been applied to a recording medium or to a cleaning tape, but they do not give satisfactory results, and further studies are needed to meet the problem.

SUMMARY OF THE INVENTION

This invention is proposed to remove a magnetic head of adherent matters which have been left when a magnetic tape runs past the head at a high speed, and intends to provide a magnetic recording medium which, even when the friction time is prolonged or the scan speed is increased to achieve a long time recording, will leave no burnt matters onto a magnetic head, reduce spacing loss, and prevent an increase in error rate. In addition, this invention intends to provide a cleaning tape which will, while causing no wear or damage of the head, remove the head of burnt matters adherent thereto.

The magnetic recording medium this invention provides is produced after at least a magnetic layer has been formed on a non-magnetic support, and an antiseize agent or an agent to prevent adherence of matters has been added thereto which contains a compound with a pyridine skeleton and two or more ligand sites (to be referred to as "ligand" hereinafter), or a diketone compound.

The compound to be used for the magnetic recording medium of this invention or a compound with pyridine skeleton and two or more ligand sites (ligand) includes at least any one chosen from the compounds represented by following chemical formulae 19–22.

[Formula 19]

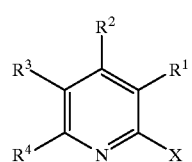

($R^1$–$R^4$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring. X is any one chosen from hydroxime, Schiff base, ester, carboxylic acid, alcohol, amine, amide, imide and polar groups containing heterocyclic aromatic compounds.)

[Formula 20]

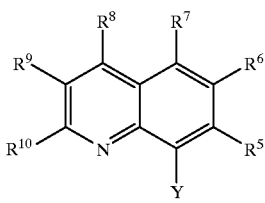

($R^5$–$R^{10}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring. Y is either OH, SH or $NH_2$.)

[Formula 21]

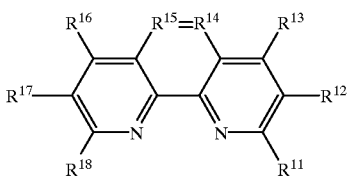

($R^{11}$–$R^{18}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 22]

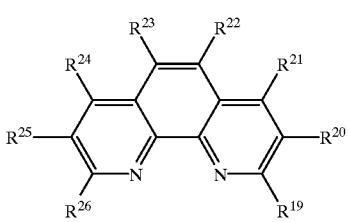

($R^{19}$–$R^{26}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

The diketone compound (ligand) to be used for the magnetic recording medium of this invention includes those represented by following Formula 23 or 24.

[Formula 23]

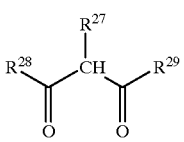

($R^{27}$–$R^{29}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups)

[Formula 24]

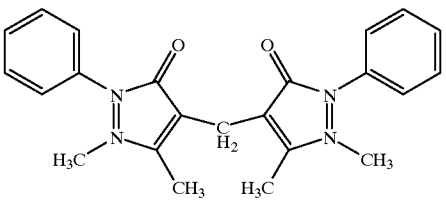

The above-described ligand has a property to form a complex in combination with metals. Therefore, when it is added to a magnetic recording medium, it forms, in combination with metal oxides generated on the surface of a magnetic head, a complex which easily drop out from the surface of the magnetic head. By this means, the magnetic head can be cleaned of metal oxides. Accordingly, when this invention is put into practice, it is possible to prevent reduction in output of a tape due to spacing loss, and to maintain the error rate at a low level, because the magnetic head becomes free from the accumulation of burnt matters.

The magnetic recording medium this invention provides is not limited to any specific structure: it may have a so-called coated magnetic layer or it may have a deposited magnetic layer.

When it has the former composition, or it has a magnetic paint mainly composed of a magnetic powder and a binder applied on its surface, an antiseize agent may be applied onto the surface of the magnetic layer, or may be added as an ingredient into the magnetic layer.

The antiseize agent to be added to the coated magnetic layer may preferably contain a titanate coupling agent or carboxylic acid in addition to the ligand.

As the ligand has a complex-forming property in combination with metal atoms, it combines or adheres to magnetic particles contained in the magnetic layer to produce complex compounds. When the ligand adheres to magnetic particles to produce complexes therewith, it can not form complexes with metal oxides adhered to the magnetic head, and hence it will be unable to clean the metal oxides.

When the ligand is allowed to coexist with a titanate coupling agent or carboxylic acid, it is prevented from adhering to magnetic particles, because titanate or carboxylic acid is easily adsorbed to the surface of magnetic particles, thereby preventing access of the ligand to the magnetic particles. By this means, the ligand can effectively form complexes with metal oxides on the surface of a magnetic head.

The antiseize agent to be added to the coated magnetic layer may be organic salts of the above-described ligand. It includes organic salts of pyridine derivatives represented by following Formula 25 or organic salts of phenanthrened derivatives represented by following Formula 26.

[Formula 25]

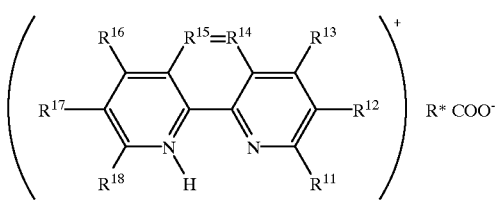

(where $R^{11}$–$R^{18}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring.

R* is chosen from alkyl group which has been substituted with hydrogen or halogen atom, or hydroxyl, nitro, carboxyl, carbonyl, amino, amide, or sulfonate group, aryl group which has been substituted with hydrogen or halogen atom, or hydroxyl, nitro, carboxyl, carbonyl, amino, amide, or sulfonate group, and alkyl group coupled with a heterocyclic aromatic group.)

[Formula 26]

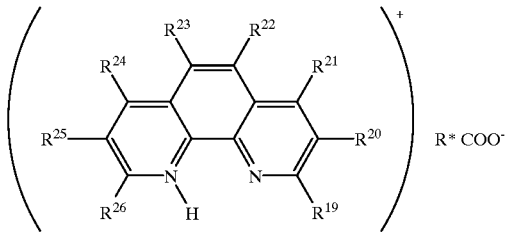

(where $R^{19}$–$R^{26}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring.

R* is chosen from alkyl group which has been substituted with hydrogen or halogen atom, or hydroxyl, nitro, carboxyl, carbonyl, amino, amide, or sulfonate group, aryl group which has been substituted with hydrogen or halogen atom, or hydroxyl, nitro, carboxyl, carbonyl, amino, amide, or sulfonate group, and alkyl group coupled with a heterocyclic aromatic group.)

The ligand may form a salt with carboxylic acid which has been added to the magnetic layer as a lubricating agent. In that case, the lubricating agent is interfered with dispersion so much that its lubricating activity is more or less disturbed. This will increase the frictional coefficient of the magnetic layer, and reduce its still endurance.

As a countermeasure for this problem, an organic salt of the ligand may be applied onto the surface of a magnetic layer, or be added into that layer. Then, the ligand, instead of forming a salt with carboxylic acid which has been added to the magnetic layer as a lubricant, allows the lubricant to smoothly move towards the surface of the magnetic recording medium. This helps the frictional coefficient of the magnetic layer to be maintained at a low level. The magnetic recording medium whose magnetic layer contains an organic salt of the ligand will have an excellent still endurance.

Further, when the magnetic recording medium has a so-called deposited magnetic layer, that is, a metal magnetic film thereupon, preferably the magnetic layer is coated with a carbon film which is further coated with an antiseize agent.

Furthermore, when the antiseize agent is applied on the surface of the carbon film, the antiseize agent preferably contains a phosphor-containing compound or any one chosen from following Formulae 27, 28, 29 and 30, because then the resulting magnetic layer will more effectively prevent the adherence of burnt matters onto a magnetic head.

[Formula 27]

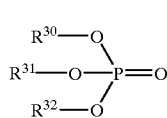

(where $R^{30}$–$R^{32}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing atoms and groups.)

[Formula 28]

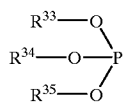

(where $R^{33}$–$R^{35}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing atoms and groups.)

[Formula 29]

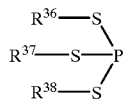

(where $R^{36}$–$R^{38}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing atoms and groups.)

[Formula 30]

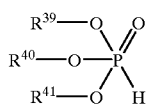

(where $R^{39}$–$R^{41}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing atoms and groups.)

A layer of antiseize agent may be put to a backcoat of one surface of a non-magnetic support, that is, on the surface opposite to that upon which the other layer of antiseize agent has been put, or it may exist as a sole antiseize layer rejecting the use of the other antiseize layer on the other surface. In the latter case, similarly to above, the antiseize agent may be coated on the surface of the backcoat layer, or added into the backcoat layer. Generally, a magnetic tape is wound to be placed into a cassette. Accordingly, when the antiseize agent is applied on the backcoat layer, that agent is transferred to the friction surface of a magnetic head. Thus, it has the same effect in preventing the generation of burnt matters as does the tape in which the antiseize agent has been added into the magnetic layer.

The cleaning tape of this invention is characterized by holding an antiseize a gent which contains a compound with a pyridine skeleton and two or more ligand sites, or a diketone compound, in its support.

The ligand to be used for the cleaning tape of this invention includes at least any one chosen from the compounds represented by above Formulae 19–22.

Further, the diketone compound to be used for the cleaning tape of this invention includes at least any one chosen from the compounds represented by Formulae 23 and 24.

As these ligands have a property to form complexes in the presence of metal atoms as discussed above, when a cleaning tape holding any one of these compounds is allowed to run past a magnetic head whose surface has burnt matters adhered, the ligand in question reacts with metal oxides generated on the surface of the magnetic head, to produce a complex. This complex easily drops out from the surface of the magnetic head to be removed therefrom.

As is seen from above discussion, when ligands having a property to combine with metals to form complexes, namely, compounds with a pyridine skeleton and two or more ligand sites, or diketone compounds are put to magnetic recording media, those magnetic recording media, when allowed to run past the magnetic head of a recorder for recording/ replay, will inhibit the generation of burnt matters on the magnetic head.

The magnetic recording medium this invention provides, even when the friction time is prolonged or the scan speed is increased to achieve a long time recording, will leave no burnt matters onto a magnetic head, reduce spacing loss, and prevent an increase in error rate.

Further, addition of a ligand having a property of combining with metals to form complexes, that is, a compound with a pyridine skeleton and two or more ligand sites, or a diketone compound as a cleaning agent of a cleaning tape will remove the magnetic head upon which it is allowed to run past of burnt matters adhered thereto without inflicting any wear or damages onto that head.

Accordingly, this cleaning tape is suitable for cleaning of the magnetic head of a recording/replay system which has a gap of 0.3 μm or less in width, and allows a tape to run past that head at a high speed.

DESCRIPTION OF THE PREFERRED EMBODIMENTS

Figure 1:
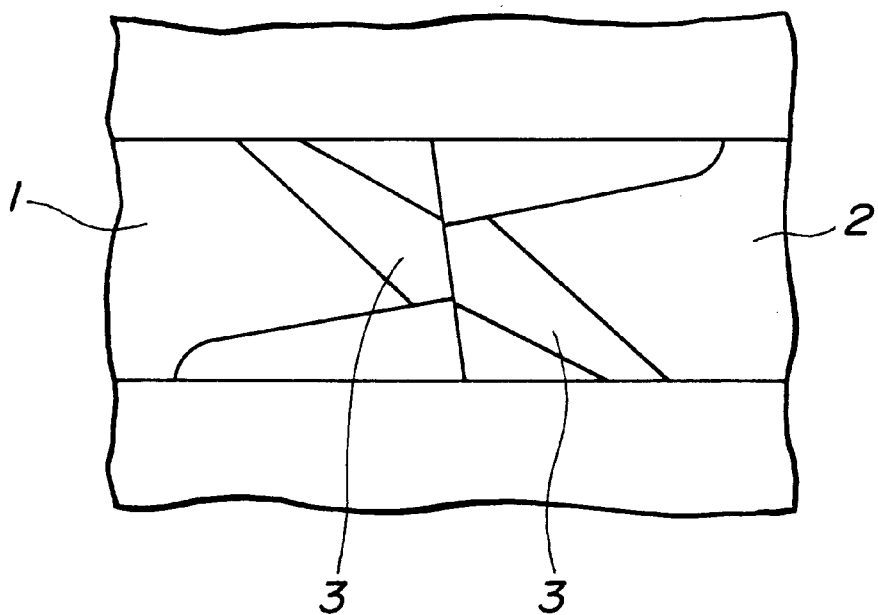
FIG. 1 gives a flat view of the surface of a magnetic head upon which a magnetic tape runs past for recording/replay.

The magnetic recording medium of this invention will be described below with reference to examples for illustration. The magnetic recording medium of this invention is produced after at least a magnetic layer has been formed on a non -magnetic support, and an antiseize agent has been put thereto which contains a compound with a pyridine skeleton and two or more ligand sites, or a diketone compound (ligand).

The ligand to be used here includes pyridine derivatives or compounds with a pyridine skeleton and two or more ligand sites as represented by following Formula 31, quinoline derivatives as represented by Formula 33, and phenanthroline derivatives as represented by Formula 34.

[Formula 31]

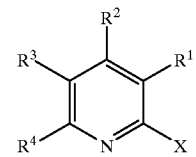

($R^1$–$R^4$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring. X is any one chosen from hydroxime, Schiff base, ester, carboxylic acid, alcohol, amine, amide, imide and polar groups containing heterocyclic aromatic compounds.)

[Formula 32]

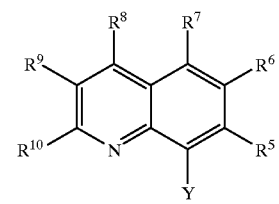

($R^5$–$R^{10}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring. Y is either OH, SH or $NH_2$.)

[Formula 33]

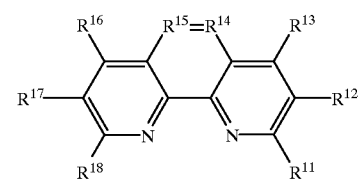

($R^{11}$–$R^{18}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 34]

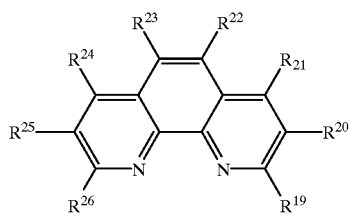

($R^{19}$–$R^{26}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

The pyridine derivatives represented by Formula 31 will be detailed below. The substituting group X can be expressed as follows according to its chemical identity: —RCNOH for hydroxime; —CHNR or —RCHNR for Schiff base; —COOR for ester; and —COOH or —RCOOH for carboxylic acid. Further; X can be expressed as —ROH or —OH for alcohol, —$NH_2R$, —NHR, —NRR, —$RNH_2$, —RNHR or —RNRR for amine; and —CONRR for imide. In these chemical symbols representing the substituting group X, R represents alkyl group, aryl group, and heterocyclic aromatic compounds, and alkyl group and aryl group and an aromatic heterocyclic compound substituted with halogen atom, hydroxyl group, nitro group, carboxyl group, carbonyl group, amino group, amide group or sulfonate group. When a chemical name contains a plurality of Rs, the Rs may be the same or different from each other. When the substituting group X contains an aromatic ring, the ring may be a five-membered ring or a ring which is produced after a benzene ring has been condensed with the same five-membered ring, or their derivatives, or may contain a pyridine ring.

The substituting group X preferably includes, for example, —$CH_2NH_2$, —COOH, —CO $OCH_3$, —$COOC_2H_5$, —$CONHC_2H_5$, —OH, the substituting groups as represented by following Formulae 35 and 36, and the substituting groups containing a pyridine ring as represented by Formula 37. Further, when the substituting group X is triazine or its derivative, the compound to be contained in the antiseize agent includes, for example, compounds represented by the general formulae as in Formulae 38 and 39, or specifically the compounds represented by Formulae 40 and 41. Furthermore, when the substituting group X is a five-membered ring with nitrogen and oxygen atoms, the compound to be contained in the antiseize agent includes, for example, compounds represented by the general formulae as in Formulae 42 and 43. Still further, when the substituting group X is a compound which results after a five-membered ring with nitrogen and oxygen atoms has been condensed with a benzene ring, the compound to be contained in the antiseize agent includes, for example, the compounds as represented by following Formulae 44 and 45.

[Formula 35]

—$CH_2CH_2NHCH_2CH_2CH_2OH$

[Formula 36]

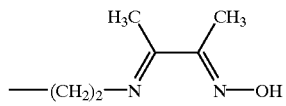

[Formula 37]

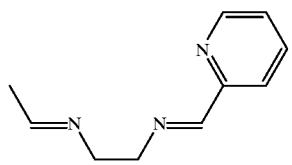

[Formula 38]

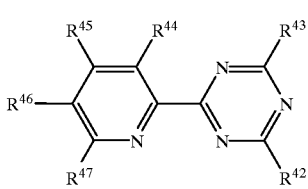

($R^{42}$–$R^{47}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 39]

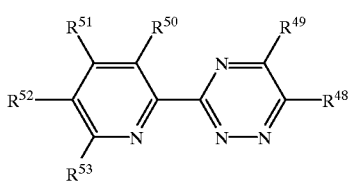

($R^{48}$–$R^{53}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 40]

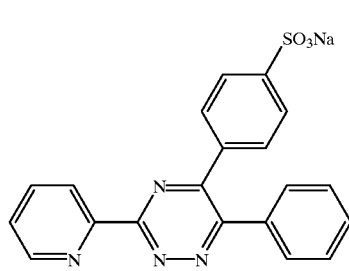

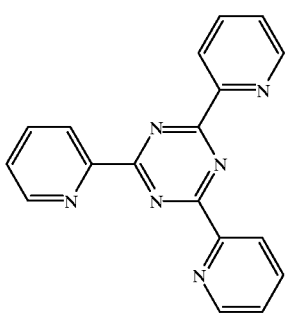

[Formula 41]

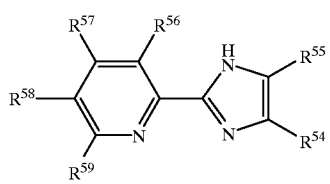

[Formula 42]

($R^{54}$–$R^{59}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

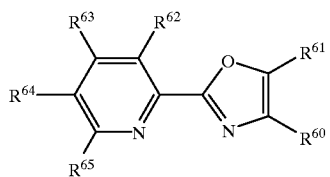

[Formula 43]

($R^{60}$–$R^{65}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

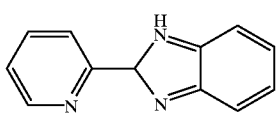

[Formula 44]

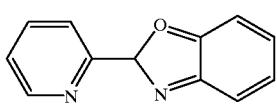

[Formula 45]

Now turn to the quinoline derivatives represented by Formula 32. of the substitutable groups $R^5$–$R^{10}$, when $R^{10}$ is substituted with a five-membered ring with nitrogen or oxygen atoms, the appropriate quinoline derivative includes those represented by the general formula such as Formula 46. Or, when $R^{10}$ is substituted with a substituting group X which is produced after a five-membered ring with nitrogen or oxygen atoms has been condensed with a benzene ring, the appropriate quinoline derivative includes those represented by the chemical formula such as Formula 47.

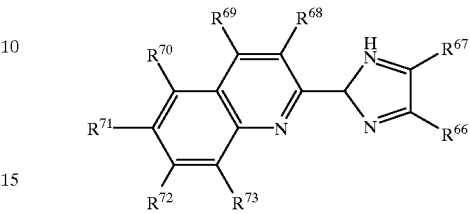

[Formula 46]

($R^{66}$–$R^{73}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

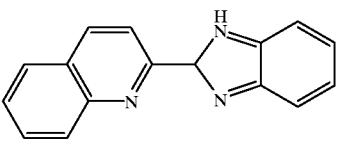

[Formula 47]

The pyridine derivative represented by above Formula 33 represents a pyridine derivative which is derived when the substituting group X of the pyridine derivative represented by Formula 3 is another pyridine derivative. The phenanthroline derivative represented by Formula 34 (Formula 4) is derived after the substitutable groups $R^{14}$ and $R^{15}$ of a pyridine derivative represented by Formula 33 have been combined to form a ring between them.

The diketone compound (ligand) to be used in this invention includes 1,3-diketone represented by following Formula 48, and 1,5-diketone represented by Formula 49.

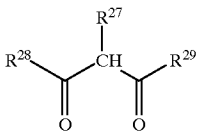

[Formula 48]

($R^{27}$–$R^{29}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups.)

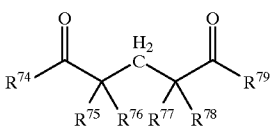

[Formula 49]

($R^{74}$–$R^{79}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

When at least any one of the substitutable groups $R^{27}-R^{29}$ in above Formula 48 is a heterocyclic aromatic compound, at least either one of the substitutable groups $R^{27}-R^{29}$ is a compound represented by Formula 50 (flan) or Formula 51 (thiophene).

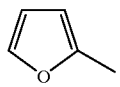

[Formula 50]

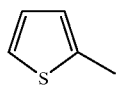

[Formula 51]

The compound represented by above Formula 49 in which two adjacent groups form a ring between them includes compounds represented by Formula 52.

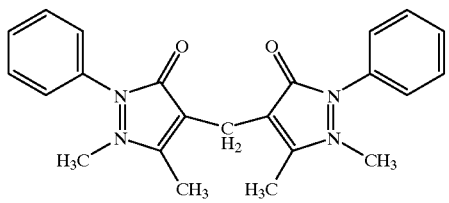

[Formula 52]

The ligands contained in antiseize agents are various in kind as indicated above, and they may be added alone or in combination. The ligand, when added into a coated magnetic layer or into a backcoat, may be chemically coupled with the antiseize agent.

The magnetic recording medium to which this invention applies is not limited to any specific conformation, and may have a magnetic layer which results from coating or depositing. When the magnetic layer is prepared by the former method, that is, prepared from a paint including a magnetic powder and a binder, the above antiseize agent may be applied on the top of the magnetic layer or added into the magnetic paint.

When the antiseize agent is applied on the surface of the magnetic layer, it is preferably adjusted to give 10 mg to 10 g for every 1 m² of the magnetic layer.

When the antiseize agent is added into the magnetic layer, it is preferably adjusted to give 0.2–20 weight parts with respect to 100 weight parts of magnetic powder. If the added amount of the antiseize agent is less than above, its inhibition of adherence of burnt matters on a magnetic head would be unsatisfactory. If the added amount of the antiseize agent is, on the contrary, more than above, the resulting magnetic recording medium would have a poor running performance, the dispersibility of magnetic powder would be reduced, and thus a good electromagnetic conversion could not be obtained.

When the antiseize agent is added into a magnetic paint to be coated, it is preferred to use, in combination, a titanate coupling agent or carboxylic acid to prevent adherence of the ligand to magnetic powder. The ligand, because of its complex-forming property in the presence of metal ions, combines or adheres to magnetic particles contained in the magnetic layer to produce a complex.

When the ligand combines with or adheres to magnetic particles to produce a complex therewith, it can not form a complex with metal oxides adhered to a magnetic head, and hence it loses a cleaning activity towards the metal oxides.

When, under these circumstances, a titanate coupling agent or carboxylic acid is allowed to coexist with the antiseize agent, these compounds adhere more readily to the surface of magnetic particles than does the ligand, and thus they prevent the adherence of ligand to the magnetic particles. They therefore effectively contribute to the complex formation of ligand with metal oxides on a magnetic head.

The preferred titanate coupling agent includes compounds which contain at least any one of amino, phosphate ester, carboxylic acid ester, acyl, carbonyl, hydroxyl and alkyl groups. It includes, for example, compounds represented by Formulae 53–57. The titanate coupling agent as specified here not only inhibits the combination/adherence of ligand with/to magnetic particles, but enhances the dispersibility of magnetic powder.

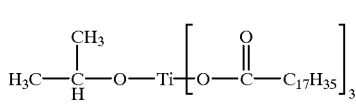

[Formula 53]

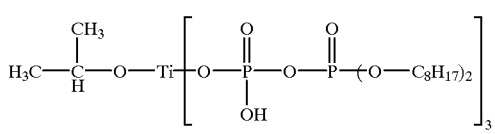

[Formula 54]

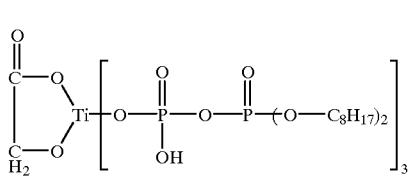

[Formula 55]

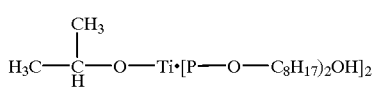

[Formula 56]

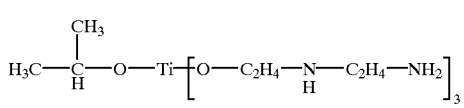

[Formula 57]

These titanate coupling agents may be used alone or in combination.

For a titanate coupling agent to be added into a magnetic layer, it is only necessary to add it to a magnetic paint while that paint is being prepared. What is important during this operation is to add the titanate coupling agent before the addition of a ligand. To be more specific, a titanate coupling agent is combined with a magnetic powder, binder and organic solvent, and kneaded for dispersion. Then, to the mixture is added a ligand. Or, the magnetic powder has been pretreated with the titanate coupling agent, and this pretreated magnetic powder is mixed with a binder and organic solvent, and kneaded for dispersion. To the resulting mass is added a ligand.

Addition of the titanate coupling agent to the magnetic layer preferably takes place to give 0.2–20 weight parts of titanate coupling agent with respect to 100 weight parts of magnetic powder. If the added amount of the coupling agent was less than above, the agent could not sufficiently inhibit the adherence of ligand to magnetic particles, and thus the preventive activity of ligand against accumulation of burnt matters on a magnetic head would be impaired. Further, the dispersibility of magnetic powder would not be sufficiently improved. If the added amount of the titanate coupling agent is, on the contrary, more than above, a majority of the functional groups of the coupling agent would remain intact without undergoing reaction with the binder and magnetic particles, and those unreacted functional groups interact each other, to interfere with the dispersibility of magnetic powder. More preferably, the coupling agent is added at 1.0–5.0 weight parts with respect to 100 weight parts of magnetic powder.

Any carboxylic acid may be used as long as it has a pKa of 6 or less, and it includes, for example, saturated fatty acids such as formic acid, acetic acid, propionic acid, acetic acid, valeric acid, caproic acid, enanthic acid, caprylic acid, peralogonic acid, capric acid, undecylic acid, lauric acid, tridecylic acid, myristic acid, pentadecylic acid, palmitic acid, heptadecylic acid, stearic acid, nonadecaic acid, arachic acid, and behenic acid, unsaturated fatty acids such as acrylic acid, crotonic acid, isocrotonic acid, undecylenic acid, oleic acid, elaidic acid, cetraric acid, erucic acid, brasidic acid, sorbic acid, linoleic acid, linolenic acid, and arachidonic acid, dicarboxylic acids with saturated fatty acids such as oxalic acid, malonic acid, succinic acid, glutaric acid, adipic acid, pimelic acid, suberic acid, azelaic acid, and sebacic acid, dicarboxylic acids with unsaturated fatty acids such as maleic acid and fumalic acid, aromatic dicarboxylic acids such as phthalic acid, isophthalic acid, and telephthalic acid, and tricarboxylic acids such as citric acid.

Particularly oleic acid and myristic acid are useful because they have also a lubricating activity. Those carboxylic acids may be used alone or in combination.

When the carboxylic acid is added into a magnetic layer, it is preferred to add 1–3 weight parts of it with respect to 100 weight parts of magnetic powder.

The titanate coupling agent or carboxylic acid compound may be combined with an antiseize agent which is added into a paint to be made into a magnetic layer, or with an antiseize agent which is applied on the surface of a magnetic layer prepared by coating or deposition. However, as the adherence of a ligand to magnetic powder must be most acutely avoided when the ligand is added into a paint to be made into a magnetic layer, addition of the titanate coupling agent or carboxylic acid to an antiseize agent will be more effective when the antiseize agent is to be put into a paint.

Further, when a ligand is added into a paint to be made into a coated magnetic layer, the organic salt of the above described ligand, especially of a compound with a pyridine skeleton and two or more ligand may be used, because such ligand will adhere less to a lubricating agent. However, the ligand may produce a salt by reacting with carboxylic acid which has been added to act as a lubricating agent in a magnetic layer. In that case, the lubricating agent comes to have a reduced dispersibility, and its lubricating activity disturbed, and the frictional coefficient of magnetic layer is increased. Thus, the resulting product will have a poor still endurance.

As a countermeasure for this problem, an organic acid salt of the ligand is applied onto the surface of a magnetic layer, or is added into that layer. Then, the ligand, instead of forming a salt with carboxylic acid which has been added thereto as a lubricant, allows the lubricant to smoothly move towards the surface of the magnetic recording medium. This helps the frictional coefficient of the magnetic layer to be maintained at a low level. As seen from this, the organic acid salt of ligand not only readily reacts with metal oxides on the surface of a magnetic head to form a complex, but helps to maintain the lubricating activity of the lubricant.

Accordingly, when a magnetic recording medium is allowed to hold an organic acid salt of ligand therein, it will prevent generation of burnt matters on the surface of a magnetic head, and have an excellent still endurance even when the contact time or the scan speed is lengthened or increased.

The organic acid salt of ligand includes those of bipyridine derivatives represented by following Formula 58, or those of phenantrene derivatives represented by Formula 59.

[Formula 58]

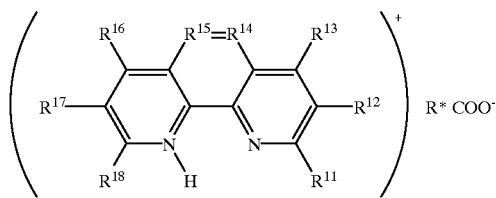

(where $R^{11}$–$R^{18}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring.

R* is chosen from alkyl group which has been substituted with hydrogen or halogen atom, or hydroxyl, nitro, carboxyl, carbonyl, amino, amide, or sulfonate group, aryl group which has been substituted with hydrogen or halogen atom, or hydroxyl, nitro, carboxyl, carbonyl, amino, amide, or sulfonate group, and alkyl group coupled with a heterocyclic aromatic group.)

[Formula 59]

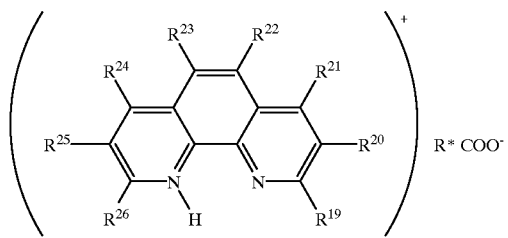

(where $R^{19}$–$R^{26}$ are chosen from hydrogen and halogen atoms, and hydroxyl, nitro , carboxyl, carbonyl, amino, amide, and sulfonate groups, and alkyl, aryl and heterocyclic aromatic groups which have been substituted with the foregoing groups. Any pair of two adjacent groups can form together an aromatic ring.

R* is chosen from alkyl group which has been substituted with hydrogen or halogen atom, or hydroxyl, nitro, carboxyl, carbonyl, amino, amide, or sulfonate group, aryl group which has been substituted with hydrogen or halogen atom, or hydroxyl, nitro, carboxyl, carbonyl, amino, amide, or sulfonate group, and alkyl group coupled with a heterocyclic aromatic group.) The organic acid which produces a salt in combination with a ligand is not limited to any specific acid, as long as it has a pKa of 3 to 7. The above-described carboxylic acid or the same monocarboxylic acid as used for the lubricating agent may be used.

The organic acid salt of ligand is added into a coated magnetic layer, or is applied on the surface of a magnetic layer. When it is added into the magnetic layer, its addition to the magnetic layer preferably takes place at 0.3–20 weight parts with respect to 100 weight parts of magnetic powder. When it is applied on the surface of magnetic layer, its content is preferably adjusted to give 10 mg to 10 g of it for every 1 m² of magnetic layer. If the added or applied amount of the organic acid salt of ligand was less than above, its inhibitory effect against adherence of burnt matters on a magnetic head would be unsatisfactory. If the added or applied amount of the organic acid salt was, on the contrary, more than above, the resulting magnetic recording medium would have a poor running performance.

On the other hand, when the magnetic recording medium has a deposited magnetic layer, that is, the magnetic layer consists of a metal-plated magnetic film, it is preferred that on the magnetic layer is formed a carbon film which is then coated with an antiseize agent. The addition of the antiseize agent is preferably so adjusted as to give the same effect as in the coated magnetic layer.

Further, when the antiseize agent is applied on the surface of carbon film, at least any one compound containing phosphor chosen from following Formulae 60–63 may be combined with the antiseize agent, in addition to a ligand.

[Formula 60]

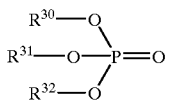

(where $R^{30}$–$R^{32}$ are chosen from hydrogen and halogen atoms, and hydroxyl, nitro, carboxyl, carbonyl, amino, amide, and sulfonate groups, and alkyl and aryl groups and heterocyclic aromatic compounds which have been substituted with the foregoing groups.)

[Formula 61]

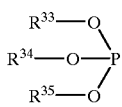

(where $R^{33}$–$R^{35}$ are chosen from hydrogen and halogen atoms, and hydroxyl, nitro, carboxyl, carbonyl, amino, amide, and sulfonate groups, and alkyl and aryl groups and heterocyclic aromatic compounds which have been substituted with the foregoing groups.)

[Formula 62]

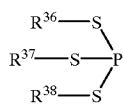

(where $R^{36}$–$R^{38}$ are chosen from hydrogen and halogen atoms, and hydroxyl, nitro, carboxyl, carbonyl, amino, amide, and sulfonate groups, and alkyl and aryl groups and heterocyclic aromatic compounds which have been substituted with the foregoing groups.)

[Formula 63]

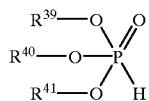

(where $R^{39}$–$R^{41}$ are chosen from hydrogen and halogen atoms, and hydroxyl, nitro, carboxyl, carbonyl, amino, amide, and sulfonate groups, and alkyl and aryl groups and heterocyclic aromatic compounds which have been substituted with the foregoing groups.)

Although it is permissible to allow a coated magnetic layer to hold such phosphor-containing compound, it is more practical to apply it on the surface of a deposited magnetic layer.

An antiseize agent may be added to a backcoat on the surface of a non-magnetic support, that is, on the surface opposite to that upon which a magnetic layer has been formed, regardless of whether the magnetic layer contains the same antiseize agent or not. In this case, similarly to above, the antiseize agent may be coated over the surface of the backcoat layer, or added into the backcoat layer. Generally, a magnetic tape is wound around a reel to be placed into a cassette. Accordingly, when the antiseize agent is put to a backcoat layer, that agent is transferred to the friction surface of magnetic head. Thus, it has the same effect in preventing the generation of burnt matters as does a tape in which the antiseize agent has been put to the magnetic layer. The an tiseize agent may be put to the backcoat at the same proportion as is required when it is applied onto or added into a magnetic layer.

The materials required for preparation of non-magnetic support and magnetic layer, that is, the necessary elements of the magnetic recording medium of this invention are not limited to any specific kinds, and may include any previously known compounds.

To cite a few for illustration, the non-magnetic support or a film base is preferably made of polymer materials represented by polyesters such as polyethylene telephthalate and polyethylene-2,6-naphthalate, polyolefins such as polypropylene, celluloses such as cellulose triacetate and cellulose diacetate, vinyl resins, polyimides, polyamides, polycarbonates, and the like. The non-magnetic support preferably has a thickness of 1.0–100 μm, or more preferably 2.0–70 μm. It may be made of a rigid material including metal plates such as aluminum alloy, glass plates, and ceramics. In this case, the surface of film base may be so treated as to present with an oxide membrane or Ni—P membrane as with almite treatment to be hardened.

When the magnetic recording medium has a coated magnetic layer, the magnetic layer is produced after a magnetic paint composed of a magnetic powder and binder has been applied onto the non-magnetic support. The magnetic powder includes $\gamma$-$Fe_2O_3$, $Fe_3O_4$, bertholide compounds of $\gamma$-$Fe_2O_3$ and $Fe_3O_4$, Co-containing $\gamma$-$Fe_2O_3$, Co-containing $Fe_3O_4$, bertholide compounds of Co-containing $\gamma$-$Fe_2O_3$ and $Fe_3O_4$, and oxides which are produced after $CrO_2$ has been allowed to contain one or more metals such as Te, Sb, Fe, Bi, etc.

Further, it may include ferromagnetic metal powders including metals such as Fe, Co and Ni, and alloys, iron carbides and iron nitrides such as Fe—Co, Fe—Ni, Fe—Co—Ni, Fe—Co—B, Fe—Co—Cr—B, Mn—Bi, Mn—Al, Fe—Co—V, Fe—Al, Fe—Ni—Al, Fe—Al—P, Fe—Ni—Si—Al, Fe—Ni—Si—Al—Mn, Fe—Mn—Zn, Fe—Ni—Zn, Co—Ni, Co—P, Fe—Co—Ni—Cr, Fe—Co—Ni—P, etc.

These ferromagnetic powders can be obtained after the oxides, hydroxyl compounds, inorganic salts or organic salts of above metal elements have been reduced in a reducing atmosphere, or through moisture. During the manufacture of a ferromagnetic metal powder, an appropriate amount of light metal element such as Al, Si, P, B, etc. may be added to prevent incineration of the powder during reduction reaction or to maintain a desired shape of the powder.

After reduction, the powder may be immersed in an organic solvent and dried, immersed in an organic solvent and exposed to a blowing of oxidizing gas for dryness, or exposed, without the use of an organic solvent, directly to a blowing of oxidizing gas whose partial pressure has been adjusted, so that it may develop a thin oxide film upon its surface, thereby acquiring. stability to oxidation. The oxide membrane formed on the surface may contain, in addition to the constituent metal or alloy as described above, Al, Si, Ca, Mg, Sr, Ba, B, S, Ti, Zn, Na, Zr, K, Y, La, Ce, Pr, Nd, Sm, Gd, Ge, Sn, Ga, etc.

Besides the oxides and ferromagnetic metal powders as described above, the magnetic powder may include hexagonal flake ferrite. The hexagonal flake ferrite includes M-, W-, Y- and Z- type barium ferrite, strontium ferrite, calcium ferrite and lead ferrite. To it may be added Co—Ti, Co—Ti—Zn, Co—Ti—Nb, Co—Ti—Zn—Nb, Cu—Zr, Ni—Ti, etc., to adjust the coercivity of the powder.

The magnetic powders may be used alone or in combination.

The magnetic powder is preferably so treated as to give following sizes.

The specific area of a particle is preferably 30–80 $m^2/g$, or more preferably 40–70 $m^2/g$. The magnetic powder whose specific area is in above range has very fine particles, and the recording medium made therefrom allows a high-density and low-noise recording.

Particularly when the magnetic powder is needle-like in shape, the needle preferably has a long axis of 0.05–0.50 $\mu$m and an axis ratio of 2–15. If the needle had a long axis below 0.05 $\mu$m, the resulting powder would not readily disperse into a paint, while if the long axis exceeded 0.50 $\mu$m, the magnetic tape made therefrom might give a big noise. Further, if the needle had an axis ratio below 2, the orienting property of the magnetic powder would be reduced, and the magnetic tape made therefrom might give a reduced output. On the contrary, if the needle had an axis ratio exceeding 15, the magnetic tape therefrom would give a reduced output in a short wave range.

When the magnetic powder is composed of flake ferrite, the flake preferably has a diameter of 0.01–0.5 $\mu$m, and a thickness of 0.001–0.2 $\mu$m.

The preferred length of long axis, axis ratio, and flake diameter and thickness described above were calculated from the measurements performed on 100 or more samples chosen at random from microphotographs taken by electron microscopy.

The binder to be added to the magnetic layer of this invention includes publicly known thermoplastic resins, thermosetting resins and reaction type resins which have been used as a binder of the magnetic recording medium, and preferably has a molecular weight of 5000–10000.

The thermoplastic resin includes polymers or copolymers composed, as polymerization units, of vinyl chloride, vinyl acetate, vinyl propionate, vinyl alcohol, maleic acid, acrylic acid, ester acrylate, methacrylate, ester methacrylate, vinylidene chloride, acrylonitrile, methacrylonitrile, stylene, methylstylene, butadiene, ethylene, vinylacetar, vinylbutyral, vinylpyrrolidone, etc. To put it in concrete terms, it includes copolymers of vinyl chloride and vinyl acetate, of vinyl chloride and vinylidene chloride, of vinyl chloride and acrilonitrile, of ester acrylate and acrilonitrile, of ester acrylate, vinyl chloride and vinylidene chloride, of vinyl chloride and acrylonitrile, of ester acrylate and acrilonitrile, of ester acrylate and vinylidene chloride, of ester methacrylate and vinylidene chloride, of ester methacrylate and vinyl chloride, of ester methacrylate and ethylene, of vinylidene chloride and acrylonitrile, of acrylonitrile and butadiene, and of polyvinylbutylal and stylenebutadiene. In addition, it includes polyfluorinated vinyl, polyamide resin, and cellulose derivatives such as cellulose acetate butylate, cellulose diacetate, cellulose triacetate, cellulose propionate, nitrocellulose, etc., and polyurethane resins, polyester resins and amino resins, and synthetic rubbers.

The thermosetting resin or reaction type resin includes, for example, phenol resins, epoxy resins, polyurethane setting resin, urea resins, melamine resins, alkyd resins, silicone resins, polyamine resins, ureaformadldehyde resins, etc.

To any one of those binders, may be added a polar functional group to improve the dispersibility of the pigment.

The polar functional group includes —$SO_3M$, —$OSO_3M$, —COOM, P=O(OM)$_2$, etc. (where M represents hydrogen atom or alkali metals such as lithium, potassium, sodium, etc.) It may also include side chain amines which have —$NR^1R^2$ or —$NR^1R^2R^3$+$X^-$ as their terminal group, or principal chain amines represented by >$NR^1R^2$+$X^-$ (where $R^1$, $R^2$ and $R^3$ represent a hydrogen atom or hydrocarbon group, and $X^-$ represents the ionic form of a halogen element such as fluorine, chlorine, bromine or iodine, or an inorganic or organic ion.) The polar functional group further includes —OH, —SH, —CN and epoxy group. The polar functional group is preferably added to the binder at $10^{-8}$–$10^{-1}$ mol/g or more preferably at $10^{-2}$–$10^{-6}$ mol/g.

The binders to be added to the magnetic layer are as described above, and they may be used alone or in combination.

The above-described magnetic powder and binder are allowed to disperse into a solvent to produce a magnetic paint. The solvent includes ketone solvents such as acetone, methyethylketone, methylisobutylketone, diisobutylketone, cycloh exanone, etc., alcohol solvents such as methanol, ethanol, propanol, butanol, isopropanol, etc., ester solvents such as methyl acetate, ethyl acetate, butyl acetate, propyl acetate, ethyl lactate, ethyleneglycol acetate, etc., ether solvents such as diethyleneglycol dimethylether, 2-ethoxyethanol, tetrahydroflan, dioxane, etc., aromatic hydrocarbon solvents such as benzene, toluene, xylene, etc., halogenated hydrocarbon solvents such as methylene chloride, ethylene chloride, carbon tetrachloride, chloroform, chlorobenzene, etc.

To the magnetic paint may be added a lubricant, abrasive, stiffener, dispersant, antistatic, anticorrosive, etc. as appropriate. The dispersant, lubricant, antistatic and anticorrosive may include any publicly known materials, and are not limited to any specific chemicals.

The lubricant includes, besides solid lubricants such as graphite, molybdenum disulfide and tungsten disulfide, monocarboxylic acids with a C10–40 alkyl chain, electrolytes of those carboxylic acids, monoesters of those carboxylic acids with alcohols with 10–40 carbons, polyhydric esters of those carboxylic acids with polyhydric alcohols, and amides, amines and alcohols with the above-described alkyl chain. It may further include silicone oil, paraffin oil, fluorides of above compounds, and turpentine compounds and their oligomers.

The abrasive includes aluminum oxide ($\alpha$, $\beta$ and $\gamma$), silicon carbide, chromium oxide, iron oxide, corrundum, diamond, silicon fluoride, titanium carbide, titanium oxide (rutile or anatase), garnet, emery, boron nitride, etc. The abrasive preferably has a Morse hardness of four or more, more preferably five or more. The abrasive preferably has a specific gravity of 2–6, or more preferably 3–5, and has an average particle size of 0.5 $\mu$m or less, or more preferably 0.3 $\mu$m or less. The preferred average particle size was calculated from them easurements performed on 100 or more samples chosen at random from microphotograms taken by electron microscopy. The abrasive is preferably added to the magnetic powder at a ratio of 20 weight parts against 100 weight parts of the latter, or more preferably 10 weight parts or less.

The antistatic preferably includes carbon black, addition of which also strengthens the resulting coat.

The dispersant includes various surfactants or coupling agents.

The stiffener includes polyisocyanates. The polyisocynate includes alkylene diisocyanates such as toluenediisocyanate, diphenylmethanediisocyanate, hexame thylenediisocyanate, etc., bifunctional isocyanate compounds such as xylenedii socynate, naphthalenediisocyanate, isophoronediisocyanate, etc., and copolymers of those diisocyanates, and reaction products with polyhydric alcohols. The stiffener is preferably added to the magnetic powder at a ratio of 5–80 weight parts against 100 weight parts of the latter, or more preferably 10–50 weight parts or less.

To prepare a magnetic paint, above materials are submitted to procedures such as kneading, mixing and dispersion. The apparatus for dispersion and kneading includes a roll mill, ball mill, sand mill, agitator, kneader, extruder, homogenizer and ultrasonic dispersion machine.

The thus prepared magnetic paint is applied, by spraying or coating as appropriate, onto a non-magnetic support, and dried to form a magnetic layer thereupon. Later, the resulting tape may be introduced into a calender to give a smooth finish on its surface.

On drying the magnetic layer preferably has a thickness of 1–50 $\mu$m, or more preferably 1.0–30 $\mu$m. The binder is preferably added to the magnetic powder at one weight part against 1–10 weight parts of the latter. If the binder was added at a higher ratio than above, the relative content of magnetic powder in the magnetic layer would be reduced, and thus the resulting recording medium would give a less output than normal. Further, if the resulting tape is allowed to run past a magnetic head or other frictional surfaces many times, the magnetic layer thereof may undergo plastic changes, and thus the tape will have a poor running performance. On the contrary, if the binder was added at a lower ratio than above, the resulting magnetic layer would be mechanically weak and the tape would have a poor running performance.

When a magnetic layer is prepared by coating, between the magnetic layer and non-magnetic support may be inserted, to improve the smoothness of magnetic layer, another non-magnetic layer (underlying layer). The non-magnetic paint is produced after dispersing a non-magnetic powder in a binder. If the magnet ic layer is directly applied over the non-magnetic support, and is extremely thin, it tends to imitate the roughness of the underlying non-magnetic support, and thus is more or less far from complete smoothness. If, on the contrary, a non-magnetic layer is inserted between the non-magnetic support and magnetic layer, a sort of cushion with a thickness is inserted between the non-magnetic support and magnetic layer, and thus the roughness of underlying non-magnetic support is absorbed by the cushion and is scarcely apparent on the surface of magnetic layer. This helps to smoothen the surface of magnetic layer.

The binder to be used for the non-magnetic layer may include the same binders as described above with regard to the magnetic layer.

The non-magnetic powder includes, for example, non-magnetic iron oxides such as $\alpha$-$Fe_2O_3$, getite, rutile type titanium oxide, anatase type titanium oxide, tin oxide, tungsten oxide, silicon oxide, zinc oxide, chromium oxide, cerium oxide, titanium carbide, BN, $\alpha$-alumina, $\beta$-alumina, $\gamma$-alumina, calcium sulfate, barium sulfate, molybdenum disulfide, magnesium carbonate, calcium carbonate, barium carbonate, strontium carbonate, barium titanate, etc. The non-magnetic powder described above may be doped with an appropriate amount of impurity according to given purposes. The non-magnetic layer may have its surface treated with compounds of Al, Si, Ti, Sn, Sb, Zr, etc., in order to improve dispersibility, electroconductivity and coloration thereof. The non-magnetic powders may be used alone or in combination. The specific area of particles of the non-magnetic powder is preferably 30–80 $m^2/g$, or more preferably 40–70 $m^2/g$.

The non-magnetic layer may contain, besides the non-magnetic powder, carbon black such as a rubber reinforcement, thermocracking carbon, a black pigment, acetylene black, etc. The specific area of particles of carbon black is preferably 100–400 $m^2/g$, and their DBP oil absorption is 20–200 ml/100 g.

The reason why the specific area of particles of carbon black and other non-magnetic particles is determined as above is that it is closely related with the smoothness of resulting non-magnetic layer, and thus of magnetic layer. When carbon black or other non-magnetic powders include particles whose size is in above range, it consists of very fine particles. Accordingly, the non-magnetic layer made therefrom will take a smooth surface, which makes it possible for the overlying magnetic layer also to take a smooth surface. Finally, the resulting recording medium, whose magnetic layer is free from surface roughness, allows a high magnetoelectric conversion because modulation noises and spacing loss are effectively suppressed.

On the other hand, when the magnetic recording medium has its magnetic layer prepared by deposition, that is, when the magnetic recording medium has the magnetic layer composed of a metal-plated magnetic film, that metal-plated magnet ic film may be produced after a ferromagnetic metal material has been deposited on the surface of non-magnetic support by electrolytic deposition, sputtering or vacuum metallization. The metal-plated magnetic film may be prepared by arranging metals such as Fe, Co, Ni, etc., or copolymers of Co—Ni, Co—Pt, Co—Pt—Ni, Fe—Co, Fe—Ni, and Fe—Co—Ni—B appropriate for on-surface recording, or by arranging copolymers of Co—Cr for in-depth recording.

The metal-plated magnetic film for on-surface recording may be produced after a base consisting of a non-magnetic element with a low melting point such as Bi, Sb, Pb, Sn, Ga, In, Ge, Si, or Ti has been formed on a non-magnetic support, and a ferromagnetic metal has been deposited or sputtered from a direction normal to the base to form the metal-plated magnetic film on that base. When the ferromagnetic metal is deposited from above onto the base, the non-magnetic element with a low melting point therein will disperse into the metal-plated magnetic film thus formed, and dissolve the orientation of metal-plated magnetic film, thereby to achieve an isotropism in on-surface directions, and to improve anti-magnetism of the product.

A carbon film is formed on the surface of such metal-plated magnetic film. The carbon film may have any internal structure: it may be graphite-like, diamond-like or amorphous. Although the carbon film is generally prepared by sputtering, it may be also formed by any other methods including CVD. The carbon film preferably has a thickness of 2–100 nm, or particularly more preferably 5–30 nm.

The magnetic recording medium to which this invention is applied may have, as described earlier, a backcoat prepared on the surface of a non-magnetic support opposite to that upon which a magnetic layer has been formed. This backcoat is formed after a carbon powder which confers electric conductivity to a binder of a magnetic paint as discussed above, and an inorganic pigment which is added to control the surface roughness of resulting coat have been mixed to disperse into each other, and is applied for inhibition of static electricity, and transference of constituents to other elements in contact with it, as well as for improvement of running performance of the resulting recording medium.

The powders to be added into the backcoat include, besides carbon black, benzo guanamine resin powders, melamine resin powders, epoxy resin powders, polyethylenetelephthalate powders, phthalocyanine pigment powders, titanium oxide powder, silicon oxide powder, molybdenum disulfide powder, tungsten disulfide powder, hydrous iron oxide powder, magnesium silicate powder, calcium carbonate powder, aluminum silicate powder, barium sulfate powder, clay powder, etc.

The powder preferably has an average particle size of 0.001–1.0 $\mu$m. If it had a particle size less than this, it would not readily disperse in a paint, and may cause the surface of backcoat to become rough. On the contrary, if it had a size larger than this, hard and big indentations would be formed on the surface of backcoat, and, when a magnetic tape possessed of such indentations is wound around a reel, the indentations are transferred to overlying tape sections. The powder is preferably added to a resin binder at 25–150 weight parts with respect to 100 weight parts of the latter. If the powder was added at a ratio less than this, the backcoat would be insufficient in its surface smoothness, while if the powder was added more profusely than above, the backcoat would be insufficient in mechanical strength.

When this invention is put into practice, adhesion of burnt matters onto a magnetic head will be prevented. The magnetic head to which this invention applies may take any constitution, as long as it comes into contact with a running tape whenever it works for recording/replay or is put into action or turned off at the start/end of recording/replay. To be more specific, the magnetic head includes the common ferrite head metal-in-gap (MIG) head, laminated head, inductive head, heads based on magnetic resistance effect (MR), etc. The head may be made of any known materials.

The examples of the cleaning tape of this invention will be described below.

The cleaning tape of this invention is produced after a compound with a pyridine skeleton and two or more ligand sites, or a diketone compound (ligand) has been put to a non-magnetic support.

The compound with a pyridine skeleton and two or more ligand sites or a diketone compound (ligand) to be used here includes any ligands cited above with regard to the antiseize agent of magnetic recording medium. To be more specific, it includes the pyridine derivatives represented by above Formula 31, quinoline derivatives represented by Formula 32, bipyridine derivatives represented by Formula 33, and phenanthroline derivatives represented by Formula 34. In this case too, the ligand may receive the substituting groups as described above. The ligands may be used alone or in combination.

Further, the diketone compound (ligand) to be used here includes any ligands which have been cited as a material of antiseize agent of the magnetic recording medium of this invention. To be more specific, it includes 1,3-diketone represented by Formula 48 and 1,5-diketone represented by Formula 49. In this case too, the ligand may receive various substituting groups as described above. Any pair of two adjacent groups of the compound represented by Formula 49 may form a heterocyclic ring between them as represented by Formula 52. The ligands may be used alone or in combination.

The above-described ligand has a complex-forming property in the presence of a metal atom. Therefore, when a cleaning tape to which such ligand has been put is allowed to run past a magnetic head, the ligand forms, in combination with metal oxides generated on the surface of the magnetic head, a complex which easily drops out from the surface of the magnetic head and thus is removed therefrom.

The support to which the ligand is put includes a polymer film made of polyethylene telephthalate, polyethylene naphthalate, polyphenylene sulfide, polyamide, polyimide, etc. The polymer film preferably has a thickness of 1.0–200 $\mu$m, or more preferably 2.0–100 $\mu$m.

The support may be also made of so-called unwoven textile that is produced after fibers made of such a polymer are connected to each other.

The support may take any shape as appropriate according to given purposes, and a cleaning tape to clean a magnetic head in contact with a magnetic tape preferably takes the form of a tape. A cleaning tape to clean a magnetic head for floppy disks includes a support in the shape of disk.

Putting a ligand to a support consists of dissolving the ligand in a solvent to produce a cleaning paint, and of applying the cleaning paint onto the support.

When the support is a polymer film, the cleaning paint is applied on the surface of the polymer film so that it is put thereto as a thin film. When the support is a piece of unwoven textile, the clearing paint soaks into the textile and is preserved therein.

The solvent includes ketone solvents such as acetone, methyethylketone, methyl isobutylketone, diisobutylketone, cyclohexanone, etc., alcohol solvents such as methanol, ethanol, propanol, butanol, isopropanol, etc., ester solvents such as methyl acetate, ethyl acetate, butyl acetate, etc., aromatic hydrocarbon solvents such as benzene, toluene, xylene, etc., and water, etc.

The cleaning layer may also be made by applying at first a layer including a binder and then by coating the cleaning paint on the top of the foregoing layer. To the foregoing layer may be added a powder such as carbon black to inhibit the development of static electricity and to improve the strength of the resulting layer.

When the cleaning paint is applied, it is preferred to add a ligand at 10 mg–10 g for every 1 m$^2$ of the support surface. If the ligand was added at a lower proportion than above, it would not effectively eliminate burnt matters adhered on a magnetic surface. On the contrary, if it was added at a higher proportion than above, the ligand itself would adhere onto the magnetic head, and there by interfere with smooth running of a tape.

The cleaning paint may be put to the support prior to use, or immediately before use.

Or, a binder may be added to the cleaning paint so that the ligand can be bonded through the binder to the support. In this case, the ligand is held by the binder layer as if it were added into the latter. The binder layer may also contain a powder such as carbon black, to inhibit the development of static electricity and to increase the strength of that layer.

The binder includes polymers or copolymers composed, as polymerization units, of vinyl chloride, vinyl acetate, vinyl propionate, vinyl alcohol, maleic acid, ester acrylate, methacrylate, ester methacrylate, vinylidene chloride, acrylonitrile, methacrylonitrile, stylene, methylstylene, butadiene, ethylene, vinylacetar, vinylbutyral, vinylether, vinylpyrrolidone, etc. It further includes cellulose resins such as nitrocellulose, cellulose acetate, etc., and polyurethane resins, phenol resins, epoxy resins, phenoxy resins, urea resins, melamine resins, alkyd resins, polyester resins, polyamide resins, silicone resins, etc.

The binder is preferably added at 10 weight parts against one weight part of the ligand, or more preferably at five weight parts or less. It preferably has a thickness of 50 μm or less on dryness, more preferably 30 μm or less.

EXAMPLES

Preferred examples according to this invention will be described below, but, needless to say, this invention is not limited to those examples.

Investigation of magnetic recording medium

Firstly, in Experiments 1–6, we studied what effects will be brought about when a compound with a pyridine skeleton and two or more ligand sites (ligand) has been put to a magnetic recording medium.

<Experiment 1>

Here we put an antiseize agent which contained a compound with a pyridine skeleton and two or more ligand sites (ligand) to a so-called coated magnetic layer, prepared a magnetic tape therefrom, and used the tape for recording/replay To put it more specifically, a following composition was prepared.

Needle-like ferromagnetic iron particles (specific area being 53.9 cm$^2$/g, coercive force 1580 Oe, and saturated magnetization 120 emu/g): 100 weight parts; Thermoplastic polyurethane resin (average molecular weight being 20,000): 10 weight parts; polymer of vinyl chloride and vinyl acetate: 10 weight parts; Carbon (average particle size being 150 nm): 5 weight parts; α-alumina (average particle size being 200 nm): 5 weight parts; Olive oil: 3 weight parts; and Mixed solvent (methylethyl ketone/methylisobutyl ketone/toluene=2:1:1): 220 weight parts These ingredients were mixed in a ball mill for 48 hours, three point five parts of a stiffener consisting of polyisocyanate was added, and the resulting mass was further mixed for 30 minutes.

The thus obtained magnetic paint was applied on a polyethylene telephthalate film with a thickness of 7 μm to give a film with a thickness of 2 μm on dryness. Later, the film was dried, submitted to a calender treatment, and left in an oven maintained at 60° C. for 20 hours to encourage hardening. Thus, a magnetic layer was formed.

The sheet was cut into strips of 8 mm in width, and onto the surface of the magnetic layer was applied an antiseize agent described later by dipping, to produce a magnetic tape.

The antiseize agent employed here was produced after a compound with a pyridine skeleton and two or more ligand sites (ligand) had been dissolved in toluene. The ligand included the compounds as represented by following Formula 64 (A-1 to A-9) of which substituting group X and R$^4$ are as represented in Table 1, and all other substitutable groups are hydrogen atoms. For the compounds A-1 to A-3, the substituting group X is as represented by Formulae 65–67. The ligand also includes the compounds as represented by Formula 68 (B-1 to B-8) of which the substituting group Y and R are as represented by Table 2, and all other substitutable groups are hydrogen atoms; the compounds as represented by Formula 69 (C-1 to C-2) of which R$^{11}$, R$^{13}$ and R$^{16}$ are as represented by Table 3 and all other substitutable groups are hydrogen atoms; and the compounds as represented by Formula 70 (D-1 to D-2) of which R$^{19}$, R$^{21}$ and R$^{24}$ are as represented by Table 4 and all other substitutable groups are hydrogen atoms. The ligand still further includes the compounds E-1 and E-2 represented by Formulae 71 and 72 which are the same with those represented by Formula 68, except that they contain the substituting group X of triazine, and the compounds F-1 and F-4 represented by Formulae 73 to 76 which are the same with those represented by Formulae 68, except that they contain the substitutable group R$^{10}$ of a heterocyclic aromatic compound. The ligand still further includes the compounds F-5 and F-6 represented by Formulae 77 and 78 which are the same with those represented by Formulae 73 and 76, except that they contain the substituting group R$^{10}$ of an heterocyclic aromatic compound. The substitutable groups R$^{80}$–R$^{99}$ of Formulae 73, 74 and 77 are all hydrogen atoms.

[Formula 64]

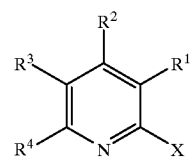

(R$^1$–R$^4$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring. X is any one chosen from hydroxime, Schiff base, ester, carboxylic acid, alcohol, amine, amide, imide and polar groups containing heterocyclic aromatic compounds.)

TABLE 1

| Compound | X | R$^1$ |
|---|---|---|
| A-1 | Formula 65 | H |
| A-2 | Formula 66 | H |
| A-3 | Formula 67 | H |
| A-4 | CH$_2$NH$_2$ | H |
| A-5 | COOCH$_3$ | H |
| A-6 | COOC$_2$H$_5$ | H |

TABLE 1-continued

| Compound | X | $R^1$ |
|---|---|---|
| A-7 | $CONHC_2H_5$ | H |
| A-8 | OH | H |
| A-9 | OH | $CH_3$ |

[Formula 65]

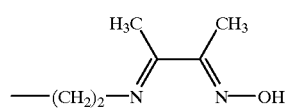

[Formula 66]

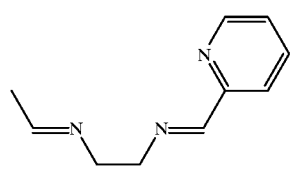

[Formula 67]

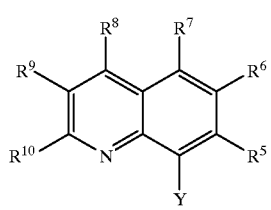

[Formula 68]

($R^5$–$R^{10}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring. Y is either OH, SH or $NH_2$.)

TABLE 2

| Compound | Y | $R^5$ |
|---|---|---|
| B-1 | $NH_2$ | H |
| B-3 | OH | $n\text{-}C_3H_7$ |
| B-2 | SH | H |
| B-4 | OH | F |
| B-5 | OH | Cl |
| B-6 | OH | $NH_2$ |
| B-7 | OH | $NO_2$ |
| B-8 | OH | $SO_3H$ |

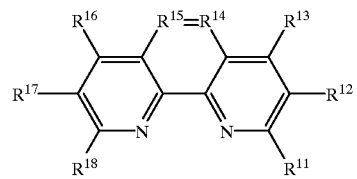

[Formula 69]

($R^{11}$–$R^{18}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

TABLE 3

| Compound | $R^{11}$ | $R^{13}$ | $R^{16}$ |
|---|---|---|---|
| C-1 | $CH_3$ | H | H |
| C-2 | $CH_3$ | $CH_3$ | H |
| C-3 | H | $CH_3$ | H |
| C-4 | H | $CH_3$ | $CH_3$ |
| C-5 | H | Aryl Group | H |
| C-6 | H | $NO_2$ | H |
| C-7 | H | $NO_2$ | $NO_2$ |
| C-8 | H | $SO_3Na$ | H |
| C-9 | H | $SO_3Na$ | $SO_3Na$ |
| C-10 | H | $NH_2$ | H |
| C-11 | H | $NH_2$ | $NH_2$ |
| C-12 | H | $CH_3(CH_2)_6$ | H |
| C-13 | H | $CH_3(CH_2)_6$ | $CH_3(CH_2)_6$ |
| C-14 | H | $CH_3(CH_2)_8$ | H |
| C-15 | H | $CH_3(CH_2)_8$ | $CH_3(CH_2)_8$ |
| C-16 | H | $CH_3(CH_2)_{10}$ | H |
| C-17 | H | $CH_3(CH_2)_{10}$ | $CH_3(CH_2)_{10}$ |
| C-18 | H | $CH_3(CH_2)_{12}$ | H |
| C-19 | H | $CH_3(CH_2)_{12}$ | $CH_3(CH_2)_{12}$ |
| C-20 | H | $CH_3(CH_2)_{14}$ | H |
| C-21 | H | $CH_3(CH_2)_{14}$ | $CH_3(CH_2)_{14}$ |
| C-22 | H | $CH_3(CH_2)_{16}$ | H |
| C-23 | H | $CH_3(CH_2)_{16}$ | $CH_3(CH_2)_{16}$ |

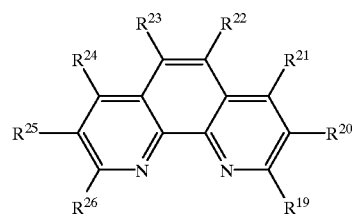

[Formula 70]

($R^{19}$–$R^{26}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

TABLE 4

| Compound | $R^{19}$ | $R^{21}$ | $R^{24}$ |
|---|---|---|---|
| D-1 | $CH_3$ | H | H |
| D-2 | $CH_3$ | $CH_3$ | H |
| D-3 | H | $CH_3$ | H |
| D-4 | H | Aryl Group | H |

TABLE 4-continued

| Compound | $R^{19}$ | $R^{21}$ | $R^{24}$ |
|---|---|---|---|
| D-5 | H | $NO_2$ | H |
| D-6 | H | $NO_2$ | $NO_2$ |
| D-7 | H | $SO_3Na$ | H |
| D-8 | H | $SO_3Na$ | $SO_3Na$ |
| D-9 | H | $NH_2$ | H |
| D-10 | H | $NH_2$ | $NH_2$ |
| D-11 | H | $CH_3(CH_2)_6$ | H |
| D-12 | H | $CH_3(CH_2)_6$ | $CH_3(CH_2)_6$ |
| D-13 | H | $CH_3(CH_2)_8$ | H |
| D-14 | H | $CH_3(CH_2)_8$ | $CH_3(CH_2)_8$ |
| D-15 | H | $CH_3(CH_2)_{10}$ | H |
| D-16 | H | $CH_3(CH_2)_{10}$ | $CH_3(CH_2)_{10}$ |
| D-17 | H | $CH_3(CH_2)_{12}$ | H |
| D-18 | H | $CH_3(CH_2)_{12}$ | $CH_3(CH_2)_{12}$ |
| D-19 | H | $CH_3(CH_2)_{14}$ | H |
| D-20 | H | $CH_3(CH_2)_{14}$ | $CH_3(CH_2)_{14}$ |
| D-21 | H | $CH_3(CH_2)_{16}$ | H |
| D-22 | H | $CH_3(CH_2)_{16}$ | $CH_3(CH_2)_{16}$ |

[Formula 71]

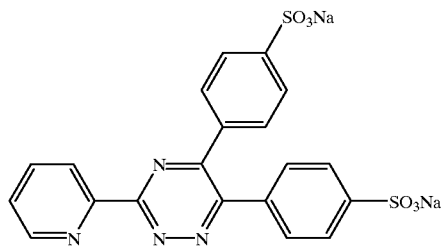

[Formula 72]

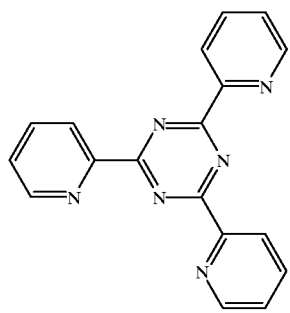

[Formula 73]

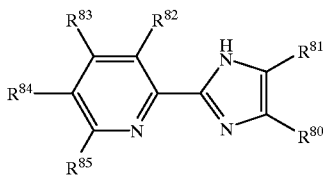

($R^{80}$–$R^{85}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 74]

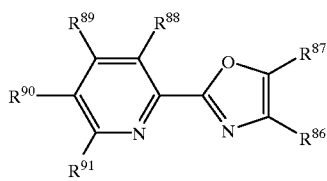

($R^{86}$–$R^{91}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 75]

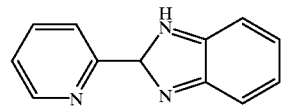

[Formula 76]

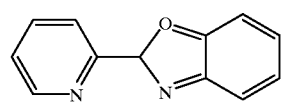

[Formula 77]

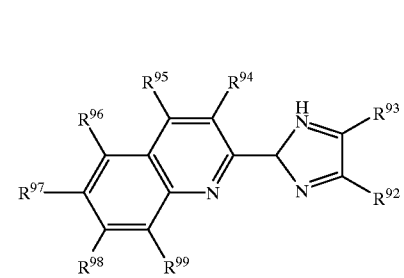

($R^{92}$–$R^{99}$ are chosen from hydrogen and halogen atoms, and hydroxyl, nitro, carboxyl, carbonyl, amino, amide, and sulfonate groups, and alkyl, aryl and hetero cyclic aromatic groups which have been substituted with the foregoing groups. Any pair of two adjacent groups can form together an aromatic ring.)

[Formula 78]

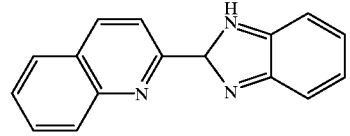

Then, magnetic tapes upon which above ligands have been applied were placed in to cassette shells to produce cartridges. They were then submitted to following evaluation tests. As a comparison similar evaluation tests were performed on magnetic tapes which had no antiseize agents as described above applied on their surface.

To be more specific, a videotape recorder was prepared which has a magnetic head as illustrated in FIG. 1, or a magnetic head which has a following constitution: a pair of ends 1 and 2 of magnetic core is made of a ferromagnetic oxide such as a single crystal ferrite, ferromagnetic metal films 3 made of a metal with a high saturation flux density or Bs such as FeAlSi alloy (Cendust) are formed by deposition on the surfaces of the two ends facing each other with a gap such that the metal films run obliquely in parallel, and thus the ferromagnetic metal films 3 face each other to have a magnetic gap between them.

This videotape recorder was used to record signals on test magnetic tapes for one minute, and to replay the signals from them. During this operation, the output from a tape was measured. Later, a tape was allowed to record signals for 20 minutes, and put to replay ten times in succession, and then the test replay was made and its output measured. The last test output was compared with the initial output, to calculate how much the last output was reduced in level (level-down) as compared with the initial output.

After the tape had been submitted to recording and replay as described above, it was removed from the videotape recorder, and its frictional surface, or the surface running past the magnetic head was examined with an electron microscope. When electron microscopy showed that, on the frictional surface of magnetic tape, burnt matters adhere on the ferromagnetic metal film 3, the tape was marked with a cross or ×. When electron microscopy showed no sign of burnt matters on the ferromagnetic film 3, the tape was marked with an open circle or ○.

The results of level-down tests and electron microscopy are listed in Tables 5–8, together with the ligand compounds used which were used to identify the test tapes. The corresponding results from the tape which did not receive any antiseize agent are also listed together.

TABLE 5

| Compound | Level-down (dB) | Absence of burnt matters |
|---|---|---|
| A-1 | 1.0 | ○ |
| A-2 | 1.5 | ○ |
| A-3 | 2.0 | ○ |
| A-4 | 1.0 | ○ |
| A-5 | 1.0 | ○ |
| A-6 | 1.5 | ○ |
| A-7 | 1.0 | ○ |
| A-8 | 1.5 | ○ |
| A-9 | 1.5 | ○ |
| B-1 | 1.0 | ○ |
| B-2 | 1.5 | ○ |
| B-3 | 1.5 | ○ |
| B-4 | 1.0 | ○ |
| B-5 | 1.0 | ○ |
| B-6 | 1.5 | ○ |
| B-7 | 1.0 | ○ |
| B-8 | 2.5 | ○ |

TABLE 6

| Compound | Level-down (dB) | Absence of burnt matters |
|---|---|---|
| C-1 | 0.5 | ○ |
| C-2 | 1.0 | ○ |
| C-3 | 0.5 | ○ |
| C-4 | 1.5 | ○ |
| C-5 | 1.0 | ○ |
| C-6 | 1.5 | ○ |
| C-7 | 2.0 | ○ |
| C-8 | 1.5 | ○ |
| C-9 | 1.5 | ○ |
| C-10 | 0.5 | ○ |
| C-11 | 1.0 | ○ |
| C-12 | 1.0 | ○ |
| C-13 | 1.5 | ○ |
| C-14 | 0.5 | ○ |
| C-15 | 0.5 | ○ |
| C-16 | 1.0 | ○ |
| C-17 | 1.0 | ○ |
| C-18 | 1.0 | ○ |
| C-19 | 1.5 | ○ |
| C-20 | 1.0 | ○ |
| C-21 | 1.5 | ○ |
| C-22 | 1.0 | ○ |
| C-23 | 1.0 | ○ |

TABLE 7

| Compound | Level-down (dB) | Absence of burnt matters |
|---|---|---|
| D-1 | 0.5 | ○ |
| D-2 | 1.0 | ○ |
| D-3 | 1.0 | ○ |
| D-4 | 1.5 | ○ |
| D-5 | 1.5 | ○ |
| D-6 | 2.0 | ○ |
| D-7 | 1.0 | ○ |
| D-8 | 2.0 | ○ |
| D-9 | 1.0 | ○ |
| D-10 | 1.0 | ○ |
| D-11 | 1.0 | ○ |
| D-12 | 1.5 | ○ |
| D-13 | 0.5 | ○ |
| D-14 | 0.5 | ○ |
| D-15 | 1.0 | ○ |
| D-16 | 1.0 | ○ |
| D-17 | 1.0 | ○ |
| D-18 | 1.5 | ○ |
| D-19 | 1.5 | ○ |
| D-20 | 1.5 | ○ |
| D-21 | 1.0 | ○ |
| D-22 | 1.0 | ○ |

TABLE 8

| Compound | Level-down (dB) | Absence of burnt matters |
|---|---|---|
| E-1 | 1.5 | ○ |
| E-2 | 1.5 | ○ |
| F-1 | 1.5 | ○ |
| F-2 | 1.0 | ○ |
| F-3 | 1.0 | ○ |
| F-4 | 1.0 | ○ |
| F-5 | 1.0 | ○ |
| F-6 | 1.0 | ○ |
| Not applied | 10 | X |

As shown in Tables 5–8, the magnetic tape which had no antiseize agent applied on its magnetic layer suffered great level-downs in output, and left burnt matters on a magnetic head upon which it ran past. By contrast, the magnetic tapes which had antiseize agents containing ligands named as compounds A-1 to A-9, B-1 to B-8, C-1 to C-23, D-1 to D-22, E-1 to E-2, and F-1 to F-6 underwent less level-downs and left no burnt matters on magnetic head.

Figure 2:
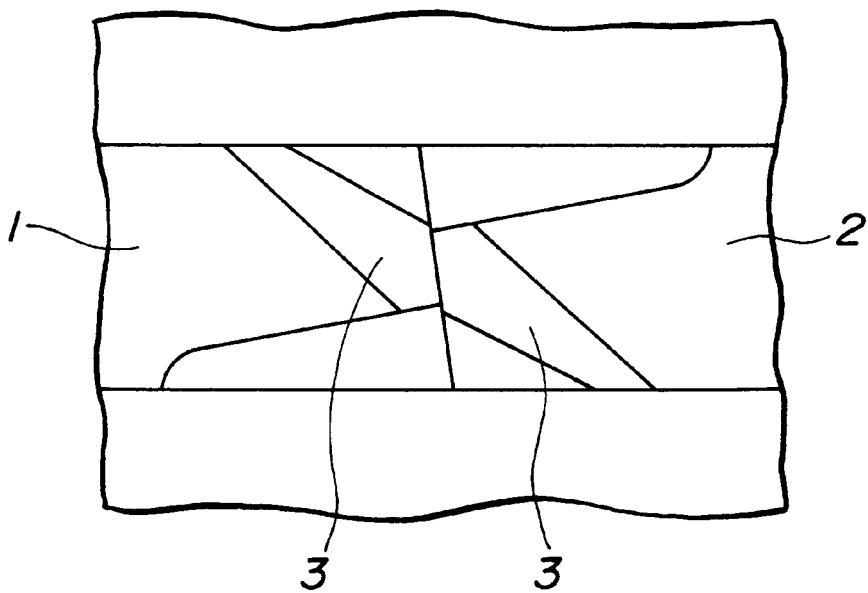
FIG. 2 gives a flat view of the magnetic head which has been used for recording/replay of a magnetic tape produced according to this invention, and which is reconstructed from electron microscopy.
Figure 3:
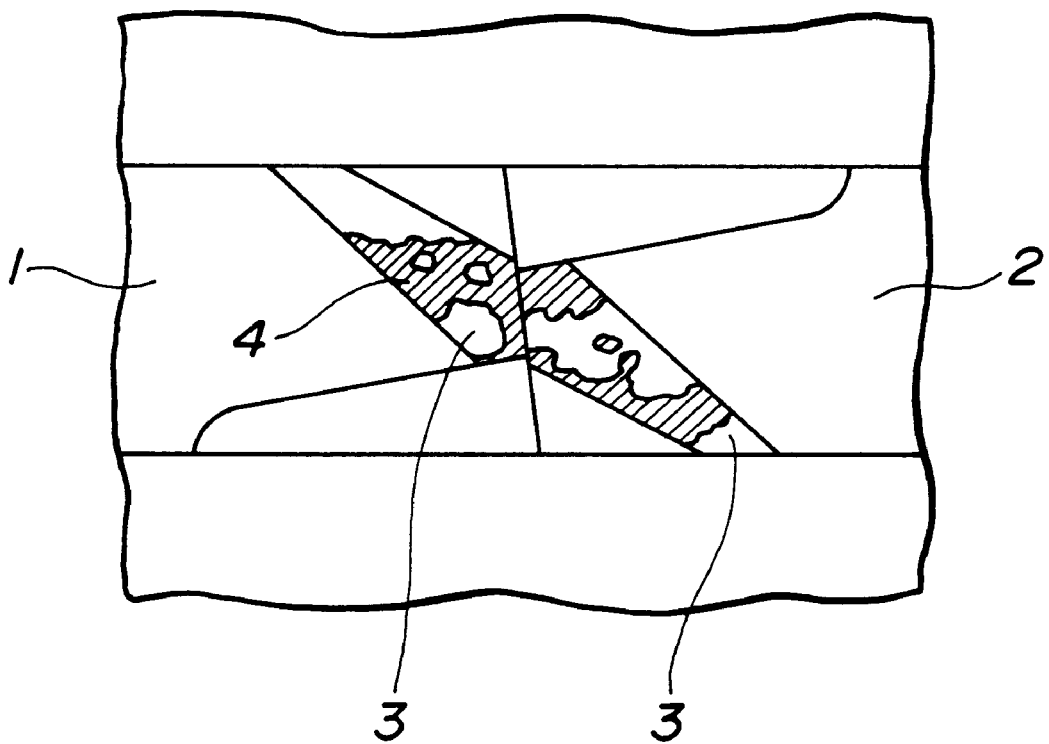
FIG. 3 gives a flat view of the magnetic head which has been used for recording/replay of a magnetic tape with no antiseize agent added, and which is reconstructed from electron microscopy.

FIG. 2 gives a schematic diagram of a magnetic head which was used for recording/replay from a magnetic tape which had an antiseize agent containing a ligand applied thereupon, being reconstructed from electron microscopic photomicrographs. FIG. 3 gives a schematic diagram of a magnetic head which was used for recording/replay from a magnetic tape which had no antiseize agent applied on its magnetic layer, being reconstructed from electron microscopic photomicrographs. FIG. 3 shows the development of burnt matters 4 on the ferromagnetic metal film 3 while FIG. 2 gives no sign of burnt matters 4 on magnetic head which looks as clean as if it has never undergone recording/replay.

From above results it was demonstrated that a tape which has an antiseize agent containing a ligand or a compound with a pyridine skeleton and one or more ligand sites applied thereupon prevents the development of burnt matters on the magnetic head upon which it runs past.

<Experiment 2>

In this experiment, an antiseize agent containing carboxylic acid together with the above-described ligand is applied onto a so-called coated magnetic layer to produce a magnetic tape.

To be more specific, the same compositions as those used in Experiment 1 were further supplemented with carboxylic acid (oleic or myristic acid): 6 weight parts; and ligand: 5 weight parts. The resulting mass was mixed, a stiffener was added thereto, and the mass was further mixed in the same manner as in Experiment 1.

As in Experiment 1, the thus obtained magnetic paint was applied on a polyethy lenetelephthalate film which was then dried and submitted to a calender treatment. The sheet was then submitted to a thermal treatment to encourage hardening, thus to form a magnetic layer thereupon. The sheet was cut into strips to produce finished magnetic tapes. In this experiment, an antiseize agent was added into the magnetic layer and thus it was not applied on the surface of the magnetic layer.

The antiseize agents to be added into the magnetic layer were produced as follows:

for the compounds A-1 to A-9, by changing the substituting group X of Formula 64 variously;

for the compound A-10 by choosing COOH for the substituting group X (X=COOH) and H for $R^1$–$R^4$ ($R^1$–$R^4$=H) of Formula 64;

for the compounds B-1 to B-8, by changing the substituting group X of Formula 68 variously;

for the compound B-9, by determining Y=OH, and $R^7$=CH3 of Formula 68; for the compound B-10, by determining Y=OH, and $R^5$–$R^{10}$=H of Formula 68; for the compounds C-24 to C-48, by determining the substitutable groups $R^{11}$, $R^{13}$, $R^{16}$ and $R^{18}$ as shown in Table 9 and choosing hydrogen atom for other substitutable groups of Formula 69;

for the compounds D-23 to D-47, by determining the substitutable groups $R^{19}$, $R^{21}$, $R^{24}$ and $R^{26}$ of Formula 70 as shown in Table 10;

for the compounds E-1 to E-2, by choosing the compounds represented by Formulae 71 and 72;

for the compounds F-1 to F-4, by choosing the compounds represented by Formulae 73–76; and for the compounds F-5 to F-6 by choosing the compounds represented by Formulae 77 and 78.

TABLE 9

| Compound | $R^{11}$ | $R^{13}$ | $R^{16}$ | $R^{18}$ |
|---|---|---|---|---|
| C-24 | H | H | H | H |
| C-25 | CH$_3$ | H | H | CH$_3$ |
| C-26 | H | CH$_3$ | CH$_3$ | H |
| C-27 | CH$_3$ | CH$_3$ | CH$_3$ | CH$_3$ |

TABLE 9-continued

| Compound | $R^{11}$ | $R^{13}$ | $R^{16}$ | $R^{18}$ |
|---|---|---|---|---|
| C-28 | H | Aryl Group | Aryl Group | H |
| C-29 | CH$_3$ | Aryl Group | Aryl Group | CH$_3$ |
| C-30 | H | Aryl Group | H | H |
| C-31 | H | CH$_3$ | H | H |
| C-32 | CH$_3$ | CH$_3$ | H | CH$_3$ |
| C-33 | H | NO$_2$ | H | H |
| C-34 | CH$_3$ | NO$_2$ | H | CH$_3$ |
| C-35 | H | NO$_2$ | NO$_2$ | H |
| C-36 | CH$_3$ | NO$_2$ | NO$_2$ | CH$_3$ |
| C-37 | H | CH$_3$(CH$_2$)$_6$ | CH$_3$(CH$_2$)$_6$ | H |
| C-38 | H | CH$_3$(CH$_2$)$_6$ | H | H |
| C-39 | CH$_3$ | CH$_3$(CH$_2$)$_6$ | CH$_3$(CH$_2$)$_6$ | CH$_3$ |
| C-40 | CH$_3$ | CH$_3$(CH$_2$)$_6$ | H | CH$_3$ |
| C-41 | H | SO$_3$Na | H | H |
| C-42 | H | SO$_3$Na | SO$_3$Na | H |
| C-43 | CH$_3$ | SO$_3$Na | H | CH$_3$ |
| C-44 | CH$_3$ | SO$_3$Na | SO$_3$Na | CH$_3$ |
| C-45 | H | CH$_3$(CH$_2$)$_{14}$ | CH$_3$(CH$_2$)$_{14}$ | H |
| C-46 | H | CH$_3$(CH$_2$)$_{14}$ | H | H |
| C-47 | CH$_3$ | CH$_3$(CH$_2$)$_{14}$ | CH$_3$(CH$_2$)$_{14}$ | CH$_3$ |
| C-48 | CH$_3$ | CH$_3$(CH$_2$)$_{14}$ | H | CH$_3$ |

TABLE 10

| Compound | $R^{19}$ | $R^{21}$ | $R^{24}$ | $R^{26}$ |
|---|---|---|---|---|
| C-23 | H | H | H | H |
| C-24 | CH$_3$ | H | H | CH$_3$ |
| C-25 | H | CH$_3$ | CH$_3$ | H |
| C-26 | CH$_3$ | CH$_3$ | CH$_3$ | CH$_3$ |
| C-27 | H | Aryl Group | Aryl Group | H |
| C-28 | CH$_3$ | Aryl Group | Aryl Group | CH$_3$ |
| C-29 | H | Aryl Group | H | H |
| C-30 | H | CH$_3$ | H | H |
| C-31 | CH$_3$ | CH$_3$ | H | CH$_3$ |
| C-32 | H | NO$_2$ | H | H |
| C-33 | CH$_3$ | NO$_2$ | H | CH$_3$ |
| C-34 | H | NO$_2$ | NO$_2$ | H |
| C-35 | CH$_3$ | NO$_2$ | NO$_2$ | CH$_3$ |
| C-36 | H | CH$_3$(CH$_2$)$_6$ | CH$_3$(CH$_2$)$_6$ | H |
| C-37 | H | CH$_3$(CH$_2$)$_6$ | H | H |
| C-38 | CH$_3$ | CH$_3$(CH$_2$)$_6$ | CH$_3$(CH$_2$)$_6$ | CH$_3$ |
| C-39 | CH$_3$ | CH$_3$(CH$_2$)$_6$ | H | CH$_3$ |
| C-40 | H | SO$_3$Na | H | H |
| C-41 | H | SO$_3$Na | SO$_3$Na | H |
| C-42 | CH$_3$ | SO$_3$Na | H | CH$_3$ |
| C-43 | CH$_3$ | SO$_3$Na | SO$_3$Na | CH$_3$ |
| C-44 | H | CH$_3$(CH$_2$)$_{14}$ | CH$_3$(CH$_2$)$_{14}$ | H |
| C-45 | H | CH$_3$(CH$_2$)$_{14}$ | H | H |
| C-46 | CH$_3$ | CH$_3$(CH$_2$)$_{14}$ | CH$_3$(CH$_2$)$_{14}$ | CH$_3$ |
| C-47 | CH$_3$ | CH$_3$(CH$_2$)$_{14}$ | H | CH$_3$ |

Magnetic tapes were produced in which the above ligand and oleic acid had been combined and added into the magnetic layer. Another kind of magnetic tapes were prepared in which the above ligand and myristic acid were combined and added into the magnetic layer. Those tapes were placed in cassette shells, made into cartridges, and submitted to following evaluation tests. As a comparison magnetic tapes whose magnetic layer was only supplemented with oleic acid or myristic acid were prepared and submitted to the same evaluation tests.

The evaluation test was performed in the same manner as in Experiment 1. The results are shown in Tables 11–17 together with the combination of a ligand and carboxylic acid which was added into the magnetic layer. Table 17 also carries the results of magnetic tapes whose magnetic layer was supplemented only with oleic or myristic acid.

TABLE 11

| Compound | Carboxylic acid | Level-down (dB) | Absence of burnt matters |
|---|---|---|---|
| A-1 | Oleic acid | 1.0 | ○ |
| A-1 | Myristic acid | 0.5 | ○ |
| A-2 | Oleic acid | 1.0 | ○ |
| A-2 | Myristic acid | 0.5 | ○ |
| A-3 | Oleic acid | 1.0 | ○ |
| A-3 | Myristic acid | 1.0 | ○ |
| A-4 | Oleic acid | 1.0 | ○ |
| A-4 | Myristic acid | 0.5 | ○ |
| A-5 | Oleic acid | 0.5 | ○ |
| A-5 | Myristic acid | 0.5 | ○ |
| A-6 | Oleic acid | 1.0 | ○ |
| A-6 | Myristic acid | 0.5 | ○ |
| A-7 | Oleic acid | 0.5 | ○ |
| A-7 | Myristic acid | 0.5 | ○ |
| A-8 | Oleic acid | 0.5 | ○ |
| A-8 | Myristic acid | 0.5 | ○ |
| A-9 | Oleic acid | 1.0 | ○ |
| A-9 | Myristic acid | 1.0 | ○ |
| A-10 | Oleic acid | 0.5 | ○ |
| A-10 | Myristic acid | 0.5 | ○ |

TABLE 12

| Compound | Carboxylic acid | Level-down (dB) | Absence of burnt matters |
|---|---|---|---|
| B-1 | Oleic acid | 1.0 | ○ |
| B-1 | Myristic acid | 0.5 | ○ |
| B-2 | Oleic acid | 1.0 | ○ |
| B-2 | Myristic acid | 0.5 | ○ |
| B-3 | Oleic acid | 1.0 | ○ |
| B-3 | Myristic acid | 0.5 | ○ |
| B-4 | Oleic acid | 0.5 | ○ |
| B-4 | Myristic acid | 0.5 | ○ |
| B-5 | Oleic acid | 0.5 | ○ |
| B-5 | Myristic acid | 0.5 | ○ |
| B-6 | Oleic acid | 1.0 | ○ |
| B-6 | Myristic acid | 0.5 | ○ |
| B-7 | Oleic acid | 0.5 | ○ |
| B-7 | Myristic acid | 0.5 | ○ |
| B-8 | Oleic acid | 0.5 | ○ |
| B-8 | Myristic acid | 0.5 | ○ |
| B-9 | Oleic acid | 1.0 | ○ |
| B-9 | Myristic acid | 1.0 | ○ |
| B-10 | Oleic acid | 1.0 | ○ |
| B-10 | Myristic acid | 1.0 | ○ |

TABLE 13

| Compound | Carboxylic acid | Level-down (dB) | Absence of burnt matters |
|---|---|---|---|
| C-24 | Oleic acid | 1.0 | ○ |
| C-24 | Myristic acid | 0.5 | ○ |
| C-25 | Oleic acid | 1.0 | ○ |
| C-25 | Myristic acid | 0.5 | ○ |
| C-26 | Oleic acid | 1.0 | ○ |
| C-26 | Myristic acid | 1.0 | ○ |
| C-27 | Oleic acid | 1.0 | ○ |
| C-27 | Myristic acid | 0.5 | ○ |
| C-28 | Oleic acid | 0.5 | ○ |
| C-28 | Myristic acid | 0.5 | ○ |
| C-29 | Oleic acid | 0.5 | ○ |
| C-29 | Myristic acid | 0.5 | ○ |
| C-30 | Oleic acid | 1.0 | ○ |
| C-30 | Myristic acid | 0.5 | ○ |
| C-31 | Oleic acid | 0.5 | ○ |
| C-31 | Myristic acid | 0.5 | ○ |
| C-32 | Oleic acid | 0.5 | ○ |
| C-32 | Myristic acid | 0.5 | ○ |
| C-33 | Oleic acid | 1.0 | ○ |
| C-33 | Myristic acid | 1.0 | ○ |
| C-34 | Oleic acid | 1.0 | ○ |
| C-34 | Myristic acid | 1.0 | ○ |
| C-35 | Oleic acid | 1.5 | ○ |
| C-35 | Myristic acid | 1.0 | ○ |
| C-36 | Oleic acid | 1.0 | ○ |
| C-36 | Myristic acid | 0.5 | ○ |

TABLE 14

| Compound | Carboxylic acid | Level-down (dB) | Absence of burnt matters |
|---|---|---|---|
| C-37 | Oleic acid | 1.0 | ○ |
| C-37 | Myristic acid | 0.5 | ○ |
| C-38 | Oleic acid | 0.5 | ○ |
| C-38 | Myristic acid | 0.5 | ○ |
| C-39 | Oleic acid | 0.5 | ○ |
| C-39 | Myristic acid | 0.5 | ○ |
| C-40 | Oleic acid | 1.0 | ○ |
| C-40 | Myristic acid | 0.5 | ○ |
| C-41 | Oleic acid | 1.5 | ○ |
| C-41 | Myristic acid | 1.0 | ○ |
| C-42 | Oleic acid | 1.0 | ○ |
| C-42 | Myristic acid | 0.5 | ○ |
| C-43 | Oleic acid | 1.0 | ○ |
| C-43 | Myristic acid | 0.5 | ○ |
| C-44 | Oleic acid | 0.5 | ○ |
| C-44 | Myristic acid | 0.5 | ○ |
| C-45 | Oleic acid | 1.0 | ○ |
| C-45 | Myristic acid | 0.5 | ○ |
| C-46 | Oleic acid | 1.0 | ○ |
| C-46 | Myristic acid | 0.5 | ○ |
| C-47 | Oleic acid | 1.0 | ○ |
| C-47 | Myristic acid | 1.0 | ○ |
| C-48 | Oleic acid | 1.0 | ○ |
| C-48 | Myristic acid | 1.0 | ○ |

TABLE 15

| Compound | Carboxylic acid | Level-down (dB) | Absence of burnt matters |
|---|---|---|---|
| D-23 | Oleic acid | 1.0 | ○ |
| D-23 | Myristic acid | 0.5 | ○ |
| D-24 | Oleic acid | 1.0 | ○ |
| D-24 | Myristic acid | 0.5 | ○ |
| D-25 | Oleic acid | 1.0 | ○ |
| D-25 | Myristic acid | 1.0 | ○ |
| D-26 | Oleic acid | 1.0 | ○ |
| D-26 | Myristic acid | 0.5 | ○ |
| D-27 | Oleic acid | 0.5 | ○ |
| D-27 | Myristic acid | 0.5 | ○ |
| D-28 | Oleic acid | 0.5 | ○ |
| D-28 | Myristic acid | 0.5 | ○ |
| D-29 | Oleic acid | 1.0 | ○ |
| D-29 | Myristic acid | 0.5 | ○ |
| D-30 | Oleic acid | 0.5 | ○ |
| D-30 | Myristic acid | 0.5 | ○ |
| D-31 | Oleic acid | 0.5 | ○ |
| D-31 | Myristic acid | 0.5 | ○ |
| D-32 | Oleic acid | 1.0 | ○ |
| D-32 | Myristic acid | 1.0 | ○ |
| D-33 | Oleic acid | 1.0 | ○ |
| D-33 | Myristic acid | 1.0 | ○ |
| D-34 | Oleic acid | 1.5 | ○ |
| D-34 | Myristic acid | 1.0 | ○ |
| D-35 | Oleic acid | 1.0 | ○ |
| D-35 | Myristic acid | 0.5 | ○ |

TABLE 16

| Compound | Carboxylic acid | Level-down (dB) | Absence of burnt matters |
|---|---|---|---|
| D-36 | Oleic acid | 1.0 | ○ |
| D-36 | Myristic acid | 0.5 | ○ |
| D-37 | Oleic acid | 0.5 | ○ |
| D-37 | Myristic acid | 0.5 | ○ |
| D-38 | Oleic acid | 0.5 | ○ |
| D-38 | Myristic acid | 0.5 | ○ |
| D-39 | Oleic acid | 1.0 | ○ |
| D-39 | Myristic acid | 0.5 | ○ |
| D-40 | Oleic acid | 1.5 | ○ |
| D-40 | Myristic acid | 1.0 | ○ |
| D-41 | Oleic acid | 1.0 | ○ |
| D-41 | Myristic acid | 0.5 | ○ |
| D-42 | Oleic acid | 1.0 | ○ |
| D-42 | Myristic acid | 0.5 | ○ |
| D-43 | Oleic acid | 0.5 | ○ |
| D-43 | Myristic acid | 0.5 | ○ |
| D-44 | Oleic acid | 1.0 | ○ |
| D-44 | Myristic acid | 0.5 | ○ |
| D-45 | Oleic acid | 1.0 | ○ |
| D-45 | Myristic acid | 0.5 | ○ |
| D-46 | Oleic acid | 1.0 | ○ |
| D-46 | Myristic acid | 1.0 | ○ |
| D-47 | Oleic acid | 1.0 | ○ |
| D-47 | Myristic acid | 1.0 | ○ |

TABLE 17

| Compound | Carboxylic acid | Level-down (dB) | Absence of burnt matters |
|---|---|---|---|
| E-1 | Oleic acid | 1.0 | ○ |
| E-1 | Myristic acid | 0.5 | ○ |
| E-2 | Oleic acid | 1.0 | ○ |
| E-2 | Myristic acid | 0.5 | ○ |
| F-1 | Oleic acid | 1.0 | ○ |
| F-1 | Myristic acid | 1.0 | ○ |
| F-2 | Oleic acid | 1.0 | ○ |
| F-2 | Myristic acid | 0.5 | ○ |
| F-3 | Oleic acid | 0.5 | ○ |
| F-3 | Myristic acid | 1.0 | ○ |
| F-4 | Oleic acid | 0.5 | ○ |
| F-4 | Myristic acid | 1.0 | ○ |
| F-5 | Oleic acid | 0.5 | ○ |
| F-5 | Myristic acid | 0.5 | ○ |
| F-6 | Oleic acid | 0.5 | ○ |
| F-6 | Myristic acid | 0.5 | ○ |
| E-1 | Not added | 4.0 | X |
| Not added | Oleic acid | 10 | X |
| Not added | Myristic acid | 10 | X |

As shown in Tables 11–17, magnetic tapes whose magnetic layer had been supplemented only with carboxylic acid suffered great level-downs in output, and caused a magnetic head to develop burnt matters on its surface. By contrast, the magnetic tapes which had a magnetic layer supplemented with a combination of ligand and carboxylic acid did not suffer level-downs, and caused no accumulation of burnt matters on the surface of magnetic head.

The magnetic tape whose magnetic layer had been supplemented only with a ligand but not with carboxylic acid caused a magnetic head to develop more or less burnt matters on in its surface, though it caused less burnt matters than the magnetic tape with no ligand. The magnetic tape which received only a ligand but not carboxylic acid also suffered a level-down of about –4 dB. It was demonstrated from above that addition of carboxylic acid to a ligand will enhance the preventive effect of the ligand against adherence of burnt matters onto a magnetic head. This is probably because carboxylic acid, being adsorbed to magnetic particles, will prevent the ligand from adhering to the magnetic particles.

When a magnetic head which was used for recording/replay from a magnetic tape which had received a combination of ligand and carboxylic acid was submitted to electron microscopy, and a schematic diagram was reconstructed from photomicrographs, a similar image to that in FIG. 2 was obtained. When a magnetic head which was used for recording/replay from a magnetic tape which had received only carboxylic acid was submitted to electron microscopy, and a schematic diagram was reconstructed from photomicrographs, a similar image to that in FIG. 3 was obtained.

From above results it was demonstrated that a tape which has received a combination of ligand, that is, a compound with a pyridine skeleton and one or more ligand sites, and carboxylic acid prevents more effectively the development of burnt matters on the magnetic head upon which it has run past than a tape which has received either ligand or carboxylic acid.

We made experiment also on tapes in which carboxylic acid had been applied on the magnetic layer, and found that the treatment did not have an appreciable effect in improving level-downs in output. Accordingly, it is more desirable to add carboxylic acid into the magnetic layer than to apply it over the magnet ic layer.

<Experiment 3>

In this experiment, an antiseize agent containing an organic acid salt of the above-described ligand is applied onto a so-called coated magnetic layer to produce a magnetic tape.

To be more specific, the same compositions as those used in Experiment 1 were further supplemented with a lubricant (oleic acid): 3 weight parts; and an organic salt of ligand: 3 weight parts. The resulting mass was mixed, as tiffener was added thereto, and the mass was further mixed in the same manner as in Experiment 1.

As in Experiment 1, the thus obtained magnetic paint was applied on a polyethy lenetelephthalate film which was then dried and submitted to a calender treatment. The sheet was then submitted to a thermal treatment to encourage hardening, thus to form a magnetic layer thereupon. The sheet was cut into strips to produce finished magnetic tapes. In this experiment, an antiseize agent was added into the magnetic layer and thus it was not applied on the surface of the magnetic layer.

The organic acid salt of a ligand to be added into the magnetic layer were produced as follows:
for the compounds C-101 to C-107, by determining the substitutable groups $R^{11}$, $R^{13}$, $R^{16}$ and $R^{18}$ and organic acid of Formula 69 as shown in Table 18 and choosing hydrogen atom for the substitutable groups $R^{12}$, $R^{14}$, $R^{15}$ and $R^{17}$; and for the compounds D-101 to D-108, by determining the substitutable groups $R^{19}$, $R^{21}$, $R^{24}$ and $R^{26}$ and organic acid of Formula 70 as shown in Table 19 and choosing hydrogen atom for the substitutable groups $R^{20}$, $R^{22}$, $R^{23}$ and $R^{25}$.

[Formula 79]

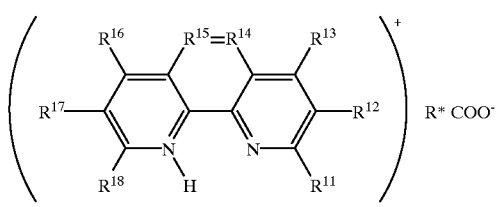

(where $R^{11}$–$R^{18}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring.

R* is chosen from alkyl group which has been substituted with hydrogen or halogen atom, or hydroxyl, nitro, carboxyl, carbonyl, amino, amide, or sulfonate group, aryl group which has been substituted with hydrogen or halogen atom, or hydroxyl, nitro, carboxyl, carbonyl, amino, amide, or sulfonate group, and alkyl group coupled with a heterocyclic aromatic group.)

TABLE 18

| Compound | $R^{11}$ | $R^{13}$ | $R^{16}$ | $R^{18}$ | Organic Acid |
|---|---|---|---|---|---|
| C-101 | H | H | H | H | Acetic Acid |
| C-102 | H | H | H | H | Myristic Acid |
| C-103 | H | H | H | H | Oleic Acid |
| C-104 | H | H | H | H | Stearic Acid |
| C-105 | $CH_3$ | H | H | $CH_3$ | Oleic Acid |
| C-106 | H | $CH_3$ | $CH_3$ | H | Oleic Acid |
| C-107 | $CH_3$ | $CH_3$ | $CH_3$ | $CH_3$ | Myristic Acid |
| Not added | — | — | — | — | — |
| C-108 | H | H | H | H | — |
| C-109 | $CH_3$ | H | H | $CH_3$ | — |
| C-110 | H | $CH_3$ | $CH_3$ | H | — |
| C-111 | $CH_3$ | $CH_3$ | $CH_3$ | $CH_3$ | — |

[Formula 80]

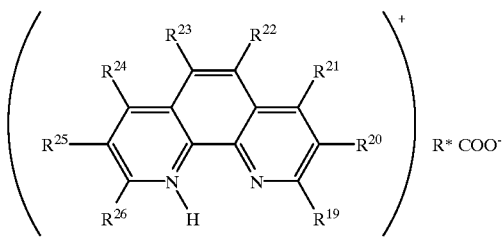

(where $R^{19}$–$R^{26}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups. Any pair of two adjacent groups can form together an aromatic ring.

R* is chosen from alkyl group which has been substituted with hydrogen or halogen atom, or hydroxyl, nitro, carboxyl, carbonyl, amino, amide, or sulfonate group, aryl group which has been substituted with hydrogen or halogen atom, or hydroxyl, nitro, carboxyl, carbonyl, amino, amide, or sulfonate group, and alkyl group coupled with a heterocyclic aromatic group.)

TABLE 19

| Compound | $R^{11}$ | $R^{13}$ | $R^{16}$ | $R^{18}$ | Organic Acid |
|---|---|---|---|---|---|
| C-101 | H | H | H | H | Acetic Acid |
| C-102 | H | H | H | H | Myristic Acid |
| C-103 | H | H | H | H | Stearic Acid |
| C-104 | H | H | H | H | Oleic Acid |
| C-105 | $CH_3$ | H | H | $CH_3$ | Oleic Acid |
| C-106 | H | $C_6H_5$ | $C_6H_5$ | H | Oleic Acid |
| C-107 | H | $CH_3$ | $CH_3$ | H | Myristic Acid |
| C-108 | $CH_3$ | $C_6H_5$ | $C_6H_5$ | $CH_3$ | — |
| Not added | — | — | — | — | — |
| C-109 | H | H | H | H | — |
| C-110 | $CH_3$ | H | H | $CH_3$ | — |
| C-111 | H | $C_6H_5$ | $C_6H_5$ | H | — |
| C-112 | H | $CH_3$ | $CH_3$ | H | — |
| C-113 | $CH_3$ | $C_6H_5$ | $C_6H_5$ | $CH_3$ | — |

The tapes in which an organic acid salt of ligand had been added into their magnetic layer were placed in cassette shells, made into cartridges, and checked for level-downs in output as in Experiment 1. The videotape recorder was set to still image mode, and the time required for the output to be reduced by –3 dB was measured to give still endurance. As a comparison magnetic tapes whose magnetic layer had not been supplemented with organic acid salts of ligand, or supplemented with ligands alone (Compounds C-108 to C-111 in Table 18, and Compounds D-109 to D-113 in Table 19) were prepared and submitted to the same evaluation tests. The results are shown in Tables 20 and 21.

TABLE 20

| Compound | Level-down (dB) | Still endurance |
|---|---|---|
| C-101 | 1 | Two hours or longer |
| C-102 | 0.5 | Two hours or longer |
| C-103 | 0.5 | Two hours or longer |
| C-104 | 1 | Two hours or longer |
| C-105 | 1 | Two hours or longer |
| C-106 | 1 | Two hours or longer |
| C-107 | 0.5 | Two hours or longer |
| Not added | 10 | Two hours or longer |
| C-108 | 1 | Thirty minutes |
| C-109 | 1 | Eighty minutes |
| C-110 | 0.5 | Thirty minutes |
| C-111 | 1 | Sixty minutes |

TABLE 21

| Compound | Level-down (dB) | Still endurance |
|---|---|---|
| D-101 | 1 | Two hours or longer |
| D-102 | 1 | Two hours or longer |
| D-103 | 0.5 | Two hours or longer |
| D-104 | 1 | Two hours or longer |
| D-105 | 1 | Two hours or longer |
| D-106 | 1 | Two hours or longer |
| D-107 | 0.5 | Two hours or longer |
| D-108 | 0.5 | Two hours or longer |
| Not added | 10 | Two hours or longer |
| D-109 | 1 | Eighty minutes |
| D-110 | 1 | Sixty minutes |
| D-111 | 1 | Twenty minutes |
| D-112 | 0.5 | Thirty minutes |
| D-113 | 1 | Ten minutes |

As seen from Tables 20 and 21, the magnetic tapes which had received organic acid salts of bipyridine derivatives represented by following Formula 79, or those of phenantrene derivatives represented by Formula 80 in their magnetic layer successfully prevented occurrence of level-downs when compared with them agnetic tapes which had not received such organic acid salts of ligands, as is confirmed in the results from Experiment 1 where magnetic tapes with ligand in their magnetic layer were compared with tapes with no such ligand in their magnetic layer.

It was also recognized that the magnetic tape which had received an organic acid salt of ligand gave a still endurance far better than did the tape which had received only a ligand. This is probably because addition of an organic acid salt of ligand prevents carboxylic acid or a lubricant from binding to the ligand to form a salt thereof, but allows the lubricant to migrate to the surface of the magnetic tape, to maintain the frictional coefficient of the tape at a low level, which in turn leads to the improvement of still endurance. When a ligand is added, instead of an organic acid salt thereof, into a magnetic layer, carboxylic acid which is added as a lubricant reacts with the ligand to form a salt which may interfere with dispersibility of the lubricant, thereby to inhibit the lubricating effect of the latter.

From above results it was demonstrated that addition of an organic acid salt of ligand into the magnetic layer of a magnetic tape prevents level-downs in output by inhibiting the accumulation of burnt matters on magnetic head, preserves the lubricating effect of lubricant and improves the still endurance of the tape.

<Experiment 4>

In this experiment, an antiseize agent containing the above-described ligand is applied onto a so-called deposited magnetic layer to produce a magnetic tape.

To be more specific, firstly, Co was deposited by oblique metallization on a polyethylenetelephthalate film with a thickness of 10 µm, to produce a ferromagnetic metal film thereupon. Onto that ferromagnetic metal film was coated a carbon film with a thickness of 10 nm by sputtering.

The resulting sheet was cut into strips with a width of 8 mm, and an antiseize agent was applied onto the carbon film by dipping, to produce a finished magnetic tape.

The antiseize agents used here were obtained after the same ligands as used in Experiments 1 and 2 had been dissolved in toluene.

Then, magnetic tapes upon which above ligands had been applied were placed into cassette shells to produce cartridges. They were then submitted to the evaluation tests as in Experiment 1. As a comparison similar evaluation tests were performed on magnetic tapes which had received no ligand. Each of test tapes was identified with the kind of ligand added thereto, and its evaluation results are listed in Tables 22 to 24.

TABLE 22

| Compound | Level-down (dB) | Absence of burnt matters |
|---|---|---|
| A-1 | 0.5 | ○ |
| A-2 | 0.5 | ○ |
| A-3 | 1.0 | ○ |
| A-4 | 0.5 | ○ |
| A-5 | 0.5 | ○ |
| A-6 | 0.5 | ○ |
| A-7 | 1.0 | ○ |
| A-8 | 1.0 | ○ |
| A-9 | 1.0 | ○ |
| A-10 | 1.5 | ○ |
| B-1 | 0.5 | ○ |
| B-2 | 0.5 | ○ |
| B-3 | 0.5 | ○ |
| B-4 | 1.5 | ○ |
| B-5 | 0.5 | ○ |
| B-6 | 0.5 | ○ |
| B-7 | 1.0 | ○ |
| B-8 | 1.0 | ○ |
| B-9 | 1.0 | ○ |
| B-10 | 1.0 | ○ |

TABLE 23

| Compound | Level-down (dB) | Absence of burnt matters |
|---|---|---|
| C-1 | 0.5 | ○ |
| C-2 | 1.0 | ○ |
| C-3 | 0.5 | ○ |
| C-4 | 1.5 | ○ |
| C-5 | 0.5 | ○ |
| C-6 | 1.0 | ○ |
| C-7 | 1.0 | ○ |
| C-8 | 1.0 | ○ |
| C-9 | 0.5 | ○ |
| C-10 | 0.5 | ○ |
| C-11 | 1.0 | ○ |
| C-12 | 0.5 | ○ |
| C-13 | 1.5 | ○ |
| C-14 | 0.5 | ○ |
| C-15 | 0.5 | ○ |
| C-16 | 1.0 | ○ |
| C-17 | 1.0 | ○ |
| C-18 | 1.0 | ○ |
| C-19 | 1.5 | ○ |
| C-20 | 0.5 | ○ |
| C-21 | 0.5 | ○ |
| C-22 | 1.0 | ○ |
| C-23 | 1.0 | ○ |
| C-24 | 0.5 | ○ |
| C-28 | 0.5 | ○ |

TABLE 24

| Compound | Level-down (dB) | Absence of burnt matters |
|---|---|---|
| D-1 | 0.5 | ○ |
| D-2 | 1.0 | ○ |
| D-3 | 0.5 | ○ |
| D-4 | 0.5 | ○ |
| D-5 | 1.0 | ○ |
| D-6 | 1.0 | ○ |
| D-7 | 1.0 | ○ |
| D-8 | 0.5 | ○ |
| D-9 | 0.5 | ○ |
| D-10 | 1.0 | ○ |
| D-11 | 0.5 | ○ |
| D-12 | 1.5 | ○ |
| D-13 | 0.5 | ○ |
| D-14 | 0.5 | ○ |
| D-15 | 1.0 | ○ |
| D-16 | 1.0 | ○ |
| D-17 | 1.0 | ○ |
| D-18 | 1.5 | ○ |
| D-19 | 0.5 | ○ |
| D-20 | 0.5 | ○ |
| D-21 | 1.0 | ○ |
| D-22 | 1.0 | ○ |
| D-23 | 0.5 | ○ |
| D-25 | 1.5 | ○ |
| D-27 | 0.5 | ○ |
| Not applied | 10 | X |

As seen from Tables 22 and 24, the magnetic tapes which had no antiseize agent applied over the carbon film suffered great level-downs and caused the magnetic head to develop burnt matters on its surface, whereas the magnetic tapes which had antiseize agents containing above ligands applied thereupon reduced level-downs, and did not cause the magnetic head to develop burnt matters on its surface.

When a magnetic head which was used for recording/replay from a magnetic tape which had received a ligand was submitted to electron microscopy, and a schematic diagram was reconstructed from photomicrographs to give a similar image to that in FIG. 2. When a magnetic head which was used for recording/replay from a magnetic tape which had not received a ligand was submitted to electron microscopy, and a schematic diagram was reconstructed from photomicrographs to give a similar image to that in FIG. 3.

From above results it was demonstrated that a tape which has an antiseize agent containing a compound with a pyridine skeleton and one or more ligand sites applied on its carbon film prevents more effectively the development of burnt matters on the magnetic head upon which it has run past than a tape which has not received such a ligand.

<Experiment 5>

In this experiment, an antiseize agent containing the above-described ligand was added into a backcoat which was made over a surface opposite to that upon which a magnetic layer had been formed, to produce a magnetic tape.

To be more specific, firstly, a so-called coated magnetic layer was formed on a polyethylenetelephthalate film with a thickness of 10 μm by the same method as in Experiment 1. A composition was prepared as follows:
Carbon black (average particle size being 50 nm): 100 weight parts; Thermoplastic urethane resin (average molecular weight being 20,000): 60 weight parts; Copolymer of vinyl chloride and vinyl acetate: 60 weight parts; Olive oil: 5 weight parts; and Mixed solvent (methylethyl ketone/methylisobutyl ketone/toluene=2:1:1): 1,150 weight parts
This composition was mixed in a ball mill for ten hours, which was followed by the addition of:
Stiffener composed of polyisocyanate: 3.5 weight parts; and Ligand: 2.5 weight parts.

The resulting mass was further mixed for 30 minutes, and the thus obtained paint for backcoat was applied on the surface opposite to that upon which a magnetic layer had been formed such that it gave a thickness of 0.8 μm on dryness.

Later, the film was dried, submitted to a calender treatment, and thermally treated to encourage hardening. The resulting sheet was cut into strips in the same manner as in Experiment 1, to produce finished magnetic tapes. The ligands used here were the same as in Experiments 1 and 2.

The tapes prepared as above and which received a ligand in their backcoat were placed in cassette shells, made into cartridges, and submitted to the same evaluation tests as in Experiment 1. As a comparison magnetic tapes which did not receive ligands were prepared and submitted to the same evaluation tests. The results are shown in Tables 25–28.

TABLE 25

| Compound | Level-down (dB) | Absence of burnt matters |
|---|---|---|
| A-1 | 1.5 | ○ |
| A-2 | 1.0 | ○ |
| A-3 | 1.0 | ○ |
| A-4 | 1.5 | ○ |
| A-5 | 1.0 | ○ |
| A-6 | 1.5 | ○ |
| A-7 | 1.0 | ○ |
| A-8 | 0.5 | ○ |
| A-9 | 1.0 | ○ |
| A-10 | 0.5 | ○ |
| B-1 | 1.0 | ○ |
| B-2 | 1.5 | ○ |
| B-3 | 1.5 | ○ |
| B-4 | 1.0 | ○ |
| B-5 | 0.5 | ○ |
| B-6 | 1.0 | ○ |
| B-7 | 1.0 | ○ |
| B-8 | 0.5 | ○ |
| B-9 | 1.5 | ○ |
| B-10 | 1.5 | ○ |

TABLE 26

| Compound | Level-down (dB) | Absence of burnt matters |
|---|---|---|
| C-24 | 1.5 | ○ |
| C-25 | 1.0 | ○ |
| C-26 | 1.0 | ○ |
| C-27 | 1.5 | ○ |
| C-28 | 1.0 | ○ |
| C-29 | 0.5 | ○ |
| C-30 | 1.0 | ○ |
| C-31 | 0.5 | ○ |
| C-32 | 1.0 | ○ |
| C-33 | 1.5 | ○ |
| C-34 | 1.0 | ○ |
| C-35 | 1.5 | ○ |
| C-36 | 1.0 | ○ |
| C-37 | 1.5 | ○ |
| C-38 | 1.0 | ○ |
| C-39 | 0.5 | ○ |
| C-40 | 1.0 | ○ |
| C-41 | 1.5 | ○ |
| C-42 | 1.5 | ○ |
| C-43 | 1.0 | ○ |
| C-44 | 1.0 | ○ |
| C-45 | 1.5 | ○ |
| C-46 | 1.0 | ○ |
| C-47 | 1.5 | ○ |
| C-48 | 1.0 | ○ |

TABLE 27

| Compound | Level-down (dB) | Absence of burnt matters |
|---|---|---|
| D-23 | 1.0 | ○ |
| D-24 | 1.5 | ○ |
| D-25 | 1.0 | ○ |
| D-26 | 1.5 | ○ |
| D-27 | 1.0 | ○ |
| D-28 | 0.5 | ○ |
| D-29 | 1.5 | ○ |
| D-30 | 0.5 | ○ |
| D-31 | 1.0 | ○ |
| D-32 | 1.0 | ○ |
| D-33 | 1.5 | ○ |
| D-34 | 1.5 | ○ |
| D-35 | 1.0 | ○ |
| D-36 | 1.0 | ○ |
| D-37 | 0.5 | ○ |
| D-38 | 0.5 | ○ |
| D-39 | 1.0 | ○ |
| D-40 | 1.5 | ○ |
| D-41 | 1.0 | ○ |
| D-42 | 1.5 | ○ |
| D-43 | 0.5 | ○ |
| D-44 | 1.5 | ○ |
| D-45 | 1.0 | ○ |
| D-46 | 1.5 | ○ |
| D-47 | 1.5 | ○ |

TABLE 28

| Compound | Level-down (dB) | Absence of burnt matters |
|---|---|---|
| E-1 | 1.5 | ○ |
| E-2 | 1.0 | ○ |
| F-1 | 1.0 | ○ |
| F-2 | 1.5 | ○ |
| F-3 | 0.5 | ○ |
| F-4 | 1.0 | ○ |
| F-5 | 0.5 | ○ |
| F-6 | 0.5 | ○ |
| Not applied | 10 | X |

As seen from Tables 25 and 28, the magnetic tapes which had not received ligands in their backcoats suffered great level-downs and caused the magnetic head to develop burnt matters on its surface, whereas the magnetic tapes which had received ligands in their backcoats suffered less level-downs, and did not cause the magnetic head to develop burnt matters on its surface.

When a magnetic head which was used for recording/replay from a magnetic tape which had received a ligand was submitted to electron microscopy, and a schematic diagram was reconstructed from photomicrographs to give a similar image to that in FIG. 2. When a magnetic head which was used for recording/replay from a magnetic tape which had not received a ligand was submitted to electron microscopy, and a schematic diagram was reconstructed from photomicrographs to give a similar image to that in FIG. 3.

From above results it was demonstrated that a tape which receives a ligand or a compound with a pyridine skeleton and one or more ligand sites in its backcoat prevents more effectively the development of burnt matters on the magnetic head upon which it has run past than a tape which has not received such a ligand.

<Experiment 6>

In this experiment, a titanate coupling agent was added, together with one of above ligands, into the so-called coated magnetic layer, to produce a magnetic tape.

To be more specific, firstly, a composition was prepared as follows:

Ferromagnetic iron powder (coercive force being 150 kA/m, saturated magnetism 145 $Am^2/kg$, specific area 51 $m^2/g$, length of long axis 0.08 $\mu m$ and needle ratio 3): 100 weight parts; Polychlorinated vinyl resin (Nippon Zeon, MR110-TM): 14 weight parts; Polyester polyurethane resin (Toyobo): 3 weight parts; $Al_2O_3$, 5 weight parts: Titanate coupling agent, 3 weight parts; Stearic acid: 1 weight part; Heptyl stearate: 1 weight part; Methylethylketone: 150 weight parts; and Cyclohexanone: 150 weight parts.

The composition was put into an extruder to be kneaded, and was allowed to disperse in a sand mill for six hours. To the thus obtained paint were added polyisocyanate three weight parts and a ligand by an amount as described in Table 29, to produce a magnetic paint.

The thus obtained magnetic paint was applied onto a polyethylenetelephthalate film with a thickness of 7 $\mu m$ to give a film with a thickness of 6.5 $\mu m$. An orientation treatment was applied to the thus formed magnetic film through a solenoid coil, and the film was dried, calendered and hardened, to produced a finished magnetic layer.

Another composition was prepared as follows:

Carbon black (Asahi, #50): 100 weight parts; Polyesterpolyurethane resin (Nipporun, N-2304): 100 weight parts; Methylethylketone: 500 weight parts; and Toluene: 500 weight parts.

The composition was mixed, kneaded and allowed to disperse into each other, to produce a backcoat paint. The backcoat paint was applied on one surface of a non-magnetic support opposite to the side upon which a magnetic layer had been formed. The resulting coat was dried to produce a backcoat layer. The sheet which had the magnetic layer formed on one surface and the backcoat on the other was cut into strips with a width of 8 mm, to produce finished magnetic tapes. The ligands to be added into the magnetic layer were produced as follows:

for the compound A-10 by choosing COOH for the substituting group X (X=COOH) and H for the substitutable groups $R^1$–$R^4$ ($R^1$–$R^4$=H) of Formula 64; for the compound B-11, by determining Y=$NH_2$, $R^5$=Cl, and H for other substitutable groups of Formula 68;

for the compound B-10, by determining Y=OH, and $R^5$–$R^{10}$=H of Formula 68; for the compound C-24, by determining $R^{11}$–$R^{18}$=H of Formula 69; for the compound C-27 by choosing CH3 for $R^{11}$, $R^{13}$, $R^{16}$ and $R^{18}$, and H for other substitutable groups of Formula 69;

for the compound C-28 by choosing aryl groups for $R^{13}$ and $R^{16}$, and H for other substitutable groups of Formula 69;

for the compound D-23, by choosing H for all substitutable groups of Formula 70; and for the compound D-26, by choosing CH3 for $R^{19}$, $R^{21}$, $R^{24}$ and $R^{26}$, and H for other substitutable groups of Formula 70;

for the compounds E-1 to E-2, by choosing the compounds represented by Formulae 71 and 72;

for the compounds F-1, F-3 and F-4, by choosing the compounds represented by Formulae 73, 75 and 76; and for the compounds F-5 and F-6, by choosing the compounds represented by Formulae 77 and 78. The substitutable groups of Formulae 73 ($R^{80}$–$R^{85}$) and 77 ($R^{92}$–$R^{98}$) were all hydrogen atoms.

The titanate coupling agent as represented by Formulae 81 to 85 were used.

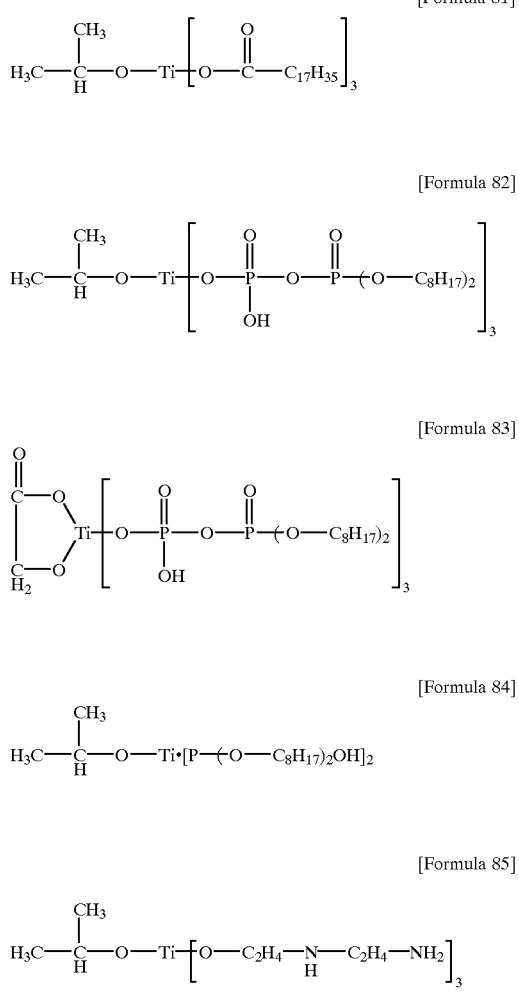

[Formula 81]

[Formula 82]

[Formula 83]

[Formula 84]

[Formula 85]

Magnetic tapes were prepared in which the above ligands and titanate coupling agents were combined and added into the magnetic layer. Those tapes were placed in cassette shells, made into cartridges, and submitted to a test as in Experiment 1 to check the level-down in output. The results are shown in Table s 29 and 30. Table 30 also gives the results from a magnetic tape which has received only a titanate coupling agent or from a magnetic tape which received only a ligand.

TABLE 29

| Compound | Addition of ligand (weight parts) | Titanate coupling agent | Level-down (db) |
| --- | --- | --- | --- |
| A-10 | 3 | Formula 81 | 0.5 |
| B-11 | 3 | Formula 81 | 0.4 |
| C-24 | 3 | Formula 81 | 0.7 |
| C-24 | 5 | Formula 81 | 0.5 |
| C-24 | 7 | Formula 81 | 0.4 |
| C-24 | 3 | Formula 82 | 0.6 |
| C-24 | 3 | Formula 83 | 0.6 |
| C-24 | 3 | Formula 84 | 0.8 |
| C-24 | 3 | Formula 85 | 0.8 |
| C-27 | 3 | Formula 81 | 0.8 |
| C-28 | 3 | Formula 81 | 0.5 |
| C-23 | 3 | Formula 81 | 0.4 |
| C-26 | 3 | Formula 81 | 0.4 |

TABLE 29-continued

| Compound | Addition of ligand (weight parts) | Titanate coupling agent | Level-down (db) |
| --- | --- | --- | --- |
| E-1 | 3 | Formula 81 | 0.5 |
| E-2 | 3 | Formula 81 | 0.6 |
| E-1 | 3 | Formula 81 | 0.5 |
| E-3 | 3 | Formula 81 | 0.4 |
| E-4 | 3 | Formula 81 | 0.4 |
| E-5 | 3 | Formula 81 | 0.4 |
| E-6 | 3 | Formula 81 | 0.5 |

TABLE 30

| Compound | Addition of ligand (weight parts) | Titanate coupling agent | Level-down (db) |
| --- | --- | --- | --- |
| Not added | — | Formula 81 | 6.2 |
| C-24 | 3 | Not added | 4.0 |
| C-24 | 3 | Formula 81 | 3.2 |

From the results of evaluation tests it was found that the magnetic tape which had received a combination of ligand and titanate coupling agent in its magnetic layer caused less adherence of burnt matters on the surface of a magnetic head than did the magnetic tape which had received only a ligand or a titanate coupling agent, and suffered less level-downs as indicated in Table 30.

As a result of evaluation tests it was found that a tape which receives a combination of a ligand and titanate coupling agent prevents more effectively the development of burnt matters on the magnetic head upon which it has run past than a tape which has received either a ligand or titanate coupling agent in its magnetic layer, and such tape also prevents the occurrence of level-downs of output more effectively as shown in Table 30.

From above results it was demonstrated that a magnetic tape which receives a combination of a ligand and titanate coupling agent more effectively prevents the development of burnt matters on a magnetic head because its ligand activity is more enhanced.

In this experiment, ligand addition was varied widely, and, as shown in Table 29, a magnetic tape which received only 0.05 weight part ligand gave similar results to those of the tape which had not received any ligand.

Level-downs in output are more effectively suppressed as the magnetic tape receives more ligand in its magnetic layer. However, if ligand addition exceeds 100 weight parts, the dispersibility of magnetic powder will be impaired. Thus, ligand addition preferably takes place at 0.3–20 weight parts, or more preferably 0.3–10 weight parts with respect to 100 weight parts of magnetic powder In this experiment, titanate coupling agents were also varied, and were found to give satisfactory results. Their effects, however, varied more or less among them. This difference may be accounted for by the difference in their adherence to magnetic powder.

In this experiment, we also prepared magnetic tapes in which a titanate coupling agent was applied on the surface of a magnetic layer. The resulting tape did not give an appreciably effect in suppression of level-downs. From this it was concluded that the titanate coupling agent is preferably added into them agnetic layer rather than applied on the surface of the latter. [Investigation of Magnetic Recording Medium 2] In Experiments 7–12, we put diketone compounds (ligands) to magnetic recording media, and investigated their effects on the recording performance of those media.

<Experiment 7>

In this experiment, an antiseize agent containing a diketone compound (ligand) was put to a so-called coated magnetic layer to produce a magnetic tape, and recording/replay of signals was made through this tape.

To be more specific, firstly, a composition was prepared as follows:
Needle-like ferromagnetic iron powder (specific area being 53.9 m²/g; coercive force 1580 Oe, saturated magnetism 120 emu/g): 100 weight parts; Thermoplastic polyurethane resin (average *fi molecular weight being 20,000): 10 weight parts; Copolymer of vinylchloride and vinylacetate: 10 weight parts; Carbon (average particle size being 150 nm): 5 weight parts; α-alumina (average particle size being 200 nm): 5 weight parts; Olive oil: 3 weight parts; and Mixed solvent (methylethylketone/methylisobutylketone/toluene= 2:1:1): 220 weight parts.

This composition was mixed in a ball mill for 48 hours, which was followed by the addition of a stiffener 3.5 weight part composed of polyisocyanate. The resulting mass was further mixed for 30 minutes The thus obtained magnetic paint was applied on the surface opposite to that upon which a magnetic layer had been formed such that the resulting film gave a thickness of 2 μm on dryness. Later, the film was dried, submitted to a calender treatment, and was put into an oven maintained at 60° C. for 20 hours to encourage hardening.

The resulting sheet was cut into strips of 8 mm in width, and the resulting tape had the below-described antiseize agent applied on its magnetic layer by dipping, to produce a finished magnetic tape.

The antiseize agent used here is produced after the ligand (diketone compound H-1) represented by following Formula 86 has been dissolved in toluene.

[Formula 86]

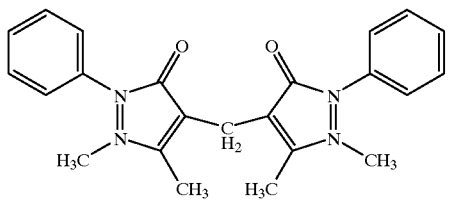

The tapes which had the above ligand applied thereupon were placed in cassette shells, made into cartridges, and submitted to following evaluation tests. As a comparison magnetic tapes which did not receive any antiseize agent were prepared and submitted to the same evaluation tests.

To be more specific, a videotape recorder was prepared which has a magnetic head as illustrated in FIG. 1, or a magnetic head which has a following constitution: a pair of ends 1 and 2 of magnetic core is made of a ferromagnetic oxide such as a single crystal ferrite, ferromagnetic metal films 3 made of a metal with a high saturation flux density or Bs such as FeAlSi alloy (Cendust) are formed by deposition on the surfaces of the two ends facing each other with a gap such that the metal films run obliquely in parallel, and thus the ferromagnetic metal films 3 face each other to form a magnetic gap between them.

This videotape recorder was used to record signals on test magnetic tapes for one minute, and to replay the signals from them. During this operation, the output from a tape was measured. Later, a tape was allowed to record signals for 20 minutes, and put to replay ten times in succession, and then the last replay was made and its output measured. The last output was compared with the initial output, to calculate how much the last output was reduced in level (level-down) as compared with the initial output.

After the tape had been submitted to recording and replay as described above, it was removed from the videotape recorder, and its frictional surface, or the surface running past the magnetic head was examined with an electron microscope. When electron microscopy showed that, on the frictional surface of magnetic tape, burnt matters adhere on the ferromagnetic metal film 3, the tape was marked with a cross or ×. When electron microscopy showed no sign of burnt matters on the ferromagnetic film 3, the tape was marked with a circle or ○.

The results of level-down tests and electron microscopy on test tapes are listed in Table 31, together with the corresponding results from the tape which did not receive any antiseize agent.

TABLE 31

| Compound | Level-down (dB) | Absence of burnt matters |
| --- | --- | --- |
| H-1 | 0.5 | ○ |
| Not applied | 10 | X |

As shown in Tables 3, the magnetic tape which had no antiseize agent applied on its magnetic layer suffered a great level-down in output, and developed burnt matters on the magnetic head upon which it ran past. By contrast, the magnetic tape which had the antiseize agent containing a ligand or compound H-1 applied thereupon suffered less level-downs and left no burnt matters on the magnetic head upon which it ran past.

FIG. 2 gives a schematic diagram of a magnetic head which was used for recording/replay from a magnetic tape which had an antiseize agent containing a ligand applied thereupon. The diagram was reconstructed from electron microscopic photomicrographs.

FIG. 3 gives a schematic diagram of a magnetic head which was used for recording/replay from a magnetic tape which had no antiseize agent applied on its magnetic layer. The diagram was reconstructed from electron microscopic photomicrographs.

FIG. 3 shows the development of burnt matters 4 on the ferromagnetic metal film 3 while FIG. 2 gives no sign of burnt matters 4 on the magnetic head. The magnetic tape looks as clean as if it had not undergone any recording/replay.

From above results it was demonstrated that a tape which has an antiseize agent containing a diketone compound applied thereupon prevents the development of burnt matters on the magnetic head upon which it has run past.

<Experiment 8>

In this experiment, an antiseize agent containing carboxylic acid in addition to above ligand was added into a so-called coated magnetic layer to produce a magnetic tape.

To be more specific, similar compositions to those used in Experiment 7 were further supplemented with carboxylic acid (oleic or myristic acid): 6 weight parts; and ligand: 5 weight parts. The resulting mass was mixed, a stiffener was added thereto, and the mass was further mixed in the same manner as in Experiment 1.

As in Experiment 7, the thus obtained magnetic paint was applied on a polyethy lenetelephthalate film which was then dried and submitted to a calender treatment. The sheet was then submitted to a thermal treatment to encourage hardening, to form a magnetic layer thereupon. The sheet was cut into strips to produce finished magnetic tapes. In this experiment, an antiseize agent was added into the magnetic layer and thus it was not applied on the surface of the magnetic layer.

The antiseize agents to be added into the magnetic layer included, in addition to compound H-1 used in Experiment 1, compounds G-1 to G-9 which were produce d after the substitutable groups $R^{27}$–$R^{29}$ of Formula 87 were chosen as shown in Table 32.

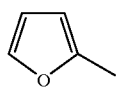

[Formula 87]

(where $R^{27}$–$R^{29}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups.)

TABLE 32

| Compound | $R^{27}$ | $R^{28}$ | $R^{29}$ |
|---|---|---|---|
| G-1 | H | H | H |
| G-2 | H | Aryl Group | Aryl Group |
| G-3 | H | $CH_3$ | $CH_3$ |
| G-4 | Aryl Group | $CH_3$ | $CH_3$ |
| G-5 | H | $CF_3$ | $CH_3$ |
| G-6 | Aryl Group | $CF_3$ | Flan |
| G-7 | H | $CF_3$ | Flan |
| G-8 | Aryl Group | $CF_3$ | Thiophene |
| G-9 | H | $CF_3$ | Thiophene |

Compounds G-5 and G-7 were as represented by Formula 88 where the substitutable group $R^{29}$ was flan, while compounds A-8 and A-9 were as represented by Formula 89 where the substitutable group $R^{29}$ was thiophene. [Formula 88]

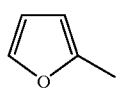

[Formula 88]

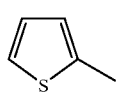

[Formula 89]

Magnetic tapes were produced in which above ligands and oleic acid had been combined and added into the magnetic layer. Another kind of magnetic tapes were prepared in which above ligands and myristic acid were combined and added into the magnetic layer. Those tapes were placed into cassette shells, made into cartridges, and submitted to following evaluation tests. As a comparison magnetic tapes whose magnetic layer was only supplemented with oleic acid or with myristic acid were prepared and submitted to the same evaluation tests.

The evaluation test was performed in the same manner as in Experiment 7. The results are shown in Table 33 together with the combination of ligands and carboxylic acid which was added into the magnetic layer. Table 33 also carries the results of magnetic tapes whose magnetic layer was supplemented only with oleic or myristic acid.

TABLE 33

| Compound | Carboxylic acid | Level-down (dB) | Absence of burnt matters |
|---|---|---|---|
| G-1 | Oleic acid | 1.0 | o |
| G-1 | Myristic acid | 0.5 | o |
| G-2 | Oleic acid | 0.5 | o |
| G-2 | Myristic acid | 0.5 | o |
| G-3 | Oleic acid | 0.5 | o |
| G-3 | Myristic acid | 0.5 | o |
| G-4 | Oleic acid | 1.0 | o |
| G-4 | Myristic acid | 0.5 | o |
| G-5 | Oleic acid | 0.5 | o |
| G-5 | Myristic acid | 0.5 | o |
| G-6 | Oleic acid | 1.0 | o |
| G-6 | Myristic acid | 1.0 | o |
| G-7 | Oleic acid | 1.0 | o |
| G-7 | Myristic acid | 1.0 | o |
| G-8 | Oleic acid | 1.5 | o |
| G-8 | Myristic acid | 1.0 | o |
| G-9 | Oleic acid | 0.5 | o |
| G-9 | Myristic acid | 0.5 | o |
| H-1 | Oleic acid | 0.5 | o |
| H-1 | Myristic acid | 0.5 | o |
| G-9 | Not added | 4.0 | X |
| Not added | Oleic acid | 10 | X |
| Not added | Myristic acid | 10 | X |

As shown in Table 33, magnetic tapes whose magnetic layer had been supplemented only with carboxylic acid suffered a great level-down in output, and caused a magnetic head to develop burnt matters on its surface. By contrast, the magnetic tapes which had a magnetic layer supplemented with a combination of ligand and carboxylic acid did not suffer level-downs, and caused no accumulation of burnt matters on the surface of a magnetic head.

The magnetic tape whose magnetic layer had been supplemented only with a ligand but not with carboxylic acid caused a magnetic head to develop more or less burnt matters on in its surface, though it caused less burnt matters than a magnetic tape which did not receive any ligand. The magnetic tape which received a ligand but not carboxylic acid also suffered level-downs of about −4 dB. It was demonstrated from above that addition of carboxylic acid to a ligand will enhance the preventive effect of the ligand against adherence of burnt matters onto a magnetic head. This is probably because carboxylic acid, being adsorbed to magnetic particles, will prevent the ligand from adhering to magnetic particles.

When a magnetic head which was used for recording/replay from a magnetic tape which had received a combination of a ligand and carboxylic acid was submitted to electron microscopy, and a schematic diagram was reconstructed from photomicrographs. The diagram give a similar image to that in FIG. 2. When a magnetic head which was used for recording/replay from a magnetic tape which had received only carboxylic acid was submitted to electron microscopy, and a schematic diagram was reconstructed from photomicrographs. The diagram give a similar image to that in FIG. 3.

From above results it was demonstrated that a tape which has received a combination of a ligand or a diketone compound and carboxylic acid prevents more effectively the development of burnt matters on the magnetic head upon which it has run past than a tape which has received only a ligand or carboxylic acid.

We made an experiment also on tapes in which carboxylic acid had been applied on the magnetic layer, and found that the treatment did not have an appreciable effect in improving the level-down in output. Accordingly, it is more desirable to add carboxylic acid into the magnetic layer than to apply it over the magnetic layer.

<Experiment 9>

In this experiment, an antiseize agent containing the above ligand was applied on the surface of a so-called coated magnetic layer to produce a magnetic tape.

To be more specific, firstly, Co was deposited by oblique metallization on a polyethylenetelephthalate film with a thickness of 10 μm, to produce a ferromagnetic metal film with a thickness of 100 nm thereupon. Onto that ferromagnetic metal film was coated a carbon film with a thickness of 10 nm by sputtering.

The resulting sheet was cut into strips with a width of 8 mm, and an antiseize agent was applied onto the carbon film by dipping, to produce a finished magnetic tape.

The antiseize agents used here were obtained after compounds G-1 to G-9 or the same ligands as used in Experiments 1 and 2 had been dissolved in toluene.

Then, magnetic tapes upon which above ligands had been applied were placed into cassette shells to produce cartridges. They were then submitted to the evaluation tests as in Experiment 7. As a comparison similar evaluation tests were performed on magnetic tapes which had received no ligand. The evaluation results are listed in Table 39.

TABLE 34

| Compound | Level-down (dB) | Absence of burnt matters |
|---|---|---|
| G-1 | 1.0 | o |
| G-2 | 1.0 | o |
| G-3 | 1.0 | o |
| G-4 | 1.0 | o |
| G-5 | 1.5 | o |
| G-6 | 1.0 | o |
| G-7 | 1.0 | o |
| G-8 | 1.0 | o |
| G-9 | 1.0 | o |
| Not applied | 10 | X |

As shown in Table 34, magnetic tapes which did not have an antiseize agent applied on their carbon film suffered a great level-down in output, and caused a magnetic head to develop burnt matters on its surface. By contrast, the magnetic tapes which had antiseize agents containing above ligands thereupon did not suffer level-downs, and caused no accumulation of burnt matters on the surface of a magnetic head.

When a magnetic head which was used for recording/replay from a magnetic tape which had a ligand applied thereupon was submitted to electron microscopy, and a schematic diagram was reconstructed from photomicrographs. The diagram give a similar image to that in FIG. 2. When a magnetic head which was used for recording/replay from a magnetic tape which did not have a ligand applied there upon was submitted to electron microscopy, and a schematic diagram was reconstructed from photomicrographs. The diagram give a similar image to that in FIG. 3.

From above results it was demonstrated that a tape which has an antiseize agent containing a ligand or a diketone compound applied on its carbon film prevents more effectively the development of burnt matters on the magnetic head upon which it has run past than a tape which has received no such ligand.

<Experiment 10>

In this experiment, an antiseize agent containing a phosphor-containing compound together with the above ligand was applied on the surface of a so-called coated magnetic layer to produce a magnetic tape.

To be more specific, firstly, as in Experiment 9, a ferromagnetic metal film and carbon film had been formed, and the resulting sheet was cut into strips to produce magnetic tapes. Onto the magnetic tape was applied an antiseize agent which was produced after the phosphor-containing compound was dissolved together with the ligand into toluene, to produce a finished magnetic tape.

The ligands to be added into the antiseize agent were compounds G-1 to G-8 or the same compounds as used in Experiment 9.

The phosphor-containing compounds to be added to the antiseize agent together with the ligand were represented by Formulae 90–93. To be more specific, the phosphor-containing compounds were represented by Formulae 90–93 where the substitutable groups $R^{30}$–$R^{41}$ took compounds represented in the rows K-1, K-2, L-1, L-2, M-1, M-2, N-1 and N-2 of Table 35, and they were identified with the name of rows.

[Formula 90]

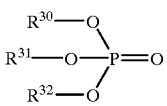

(where $R^{30}$–$R^{32}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups.)

[Formula 91]

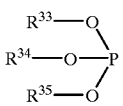

(where $R^{33}$–$R^{35}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups.)

[Formula 92]

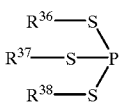

(where $R^{36}$–$R^{38}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups.)

[Formula 93]

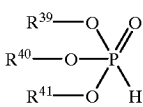

(where $R^{39}$–$R^{41}$ are chosen from hydrogen and halogen atoms, and hydroxyl, nitro, carboxyl, carbonyl, amino, amide, and sulfonate groups, and alkyl, aryl and heterocyclic aromatic groups which have been substituted with the foregoing groups.)

TABLE 35

| Compound | $R^{30}, R^{33}, R^{36}, R^{39}$ | $R^{31}, R^{34}, R^{37}, R^{40}$ | $R^{32}, R^{35}, R^{38}, R^{41}$ |
|---|---|---|---|
| K-1 | $R^{30} = C_{12}H_{25}$ | $R^{31} = C_{12}H_{25}$ | $R^{32} = C_{12}H_{25}$ |
| K-2 | $R^{30} = C_{18}H_{37}$ | $R^{31} = C_{18}H_{37}$ | $R^{32} = C_{18}H_{37}$ |
| L-1 | $R^{33} = C_{12}H_{25}$ | $R^{34} = C_{12}H_{25}$ | $R^{35} = C_{12}H_{25}$ |
| L-2 | $R^{33} = C_{18}H_{37}$ | $R^{34} = C_{18}H_{37}$ | $R^{35} = C_{18}H_{37}$ |
| M-1 | $R^{36} = C_{12}H_{25}$ | $R^{37} = C_{12}H_{25}$ | $R^{38} = C_{12}H_{25}$ |
| M-2 | $R^{36} = C_{18}H_{37}$ | $R^{37} = C_{18}H_{37}$ | $R^{38} = C_{18}H_{37}$ |
| N-1 | $R^{39} = C_{12}H_{25}$ | $R^{40} = C_{12}H_{25}$ | $R^{41} = C_{12}H_{25}$ |
| N-2 | $R^{39} = C_{18}H_{37}$ | $R^{40} = C_{18}H_{37}$ | $R^{41} = C_{18}H_{37}$ |

Then, magnetic tapes upon which antiseize agents containing above ligands and phosphor-containing compounds had been applied were placed into cassette shells to produce cartridges. They were then submitted to the evaluation tests as in Experiment 7. As a comparison similar evaluation tests were performed on magnetic tapes upon which antiseize agents containing no ligand had been applied. The evaluation results are listed in Table 36

TABLE 36

| Compound | Phosphor-containing compound | Level-down (dB) | Absence of burnt matters |
|---|---|---|---|
| G-1 | K-1 | 0.7 | ○ |
| G-1 | K-2 | 1.0 | ○ |
| G-1 | L-1 | 0.6 | ○ |
| G-1 | L-2 | 0.7 | ○ |
| G-1 | M-1 | 0.4 | ○ |
| G-1 | M-2 | 0.6 | ○ |
| G-1 | N-1 | 0.9 | ○ |
| G-1 | N-2 | 1.2 | ○ |
| G-2 | K-1 | 0.6 | ○ |
| G-2 | L-1 | 0.7 | ○ |
| G-3 | K-1 | 0.6 | ○ |
| G-4 | K-1 | 0.7 | ○ |
| G-4 | L-1 | 0.6 | ○ |
| G-4 | M-1 | 0.4 | ○ |
| G-5 | K-1 | 0.9 | ○ |
| G-6 | K-1 | 0.6 | ○ |
| G-6 | L-1 | 0.6 | ○ |
| G-7 | K-1 | 0.7 | ○ |
| G-8 | K-1 | 0.7 | ○ |
| G-8 | L-1 | 0.7 | ○ |
| Not added | K-1 | 8.0 | X |
| Not added | K-2 | 9.5 | X |
| Not added | L-1 | 7.0 | X |
| Not added | L-2 | 8.0 | X |
| Not added | M-1 | 6.0 | X |
| Not added | M-2 | 7.0 | X |
| Not added | N-1 | 8.0 | X |
| Not added | N-2 | 9.0 | X |

As shown in Table 36, magnetic tapes which had only phosphor-containing compounds applied thereupon suffered great level-downs in output, and caused a magnetic head to develop burnt matters on its surface. By contrast, the magnetic tapes which had a combination of ligand and phosphor-containing compound applied thereupon did not suffer level-downs, and caused no accumulation of burnt matters on the surface of a magnetic head.

In Experiment 9, magnetic tapes which had only ligands applied on their magnetic layers without the use of phosphor-containing compounds, were also submitted to evaluation tests. The test results showed that a magnetic tape which receives a ligand in combination with a phosphor-containing compound will give better results than a tape which receives the ligand alone, as long as the ligand is limited to those used in Experiment 9.

A magnetic head which was used for recording/replay from a magnetic tape which had a combination of a ligand and phosphor-containing compound applied thereupon was submitted to electron microscopy, and a schematic diagram was reconstructed from photomicrographs. The diagram give a similar image to that in FIG. 2. A magnetic head which was used for recording/replay from a magnetic tape which had a phosphor-containing compound alone applied thereupon was submitted to electron microscopy, and a schematic diagram was reconstructed from photomicrographs. The diagram give a similar image to that in FIG. 3.

From above results it was demonstrated that a tape which receives a combination of a ligand or a diketone compound and a phosphor compound in its magnetic layer prevents more effectively the development of burnt matters on the magnetic head upon which it has run past than a tape which has received no such combination.

<Experiment 11>

In this experiment, an antiseize agent containing the above-described ligand was added into a backcoat which was made over a surface opposite to that upon which a magnetic layer had been formed, to produce a magnetic tape.

To be more specific, firstly, a so-called coated magnetic layer was formed on a polyethylenetelephthalate film with a thickness of 7 μm by the same method as in Experiment 7. A composition was prepared as follows:

Carbon black (average particle size being 50 nm): 100 weight parts; Thermoplastic urethane resin (average molecular weight being 20,000): 60 weight parts; Copolymer of vinyl chloride and vinyl acetate: 60 weight parts; Olive oil: 5 weight parts; and Mixed solvent (methylethyl ketone/methylisobutyl ketone/toluene=2:1:1): 1,150 weight parts This composition was mixed in a ball mill for ten hours, which was followed by the addition of:

Stiffener composed of polyisocyanate: 3.5 weight parts; and Ligand: 2.5 weight parts.

The resulting mass was further mixed for 30 minutes, and the thus obtained paint for backcoat was applied on the surface opposite to that upon which a magnetic layer had been formed such that it gave a thickness of 0.8 μm on dryness.

Later, the film was dried, submitted to a calender treatment, and thermally treated to encourage hardening. The resulting sheet was cut into strips in the same manner as in Experiment 1, to produce finished magnetic tapes.

The ligands used here were compounds G-1 to G-9, and H-1 or the same as used in above Experiments 7 and 10.

The tapes prepared as above and which received above ligands in their backcoats were placed in cassette shells, made into cartridges, and submitted to the same evaluation tests as in Experiment 7. As a comparison magnetic tapes which did not receive ligands were prepared and submitted to the same evaluation tests. The results are shown in Tables 37.

TABLE 37

| Compound | Level-down (dB) | Absence of burnt matters |
|---|---|---|
| G-1 | 1.5 | ○ |
| G-2 | 0.5 | ○ |
| G-3 | 1.0 | ○ |
| G-4 | 1.0 | ○ |
| G-5 | 1.0 | ○ |
| G-6 | 0.5 | ○ |

TABLE 37-continued

| Compound | Level-down (dB) | Absence of burnt matters |
|---|---|---|
| G-7 | 1.5 | ○ |
| G-8 | 1.0 | ○ |
| G-9 | 1.5 | ○ |
| H-1 | 0.5 | ○ |
| Not applied | 10 | X |

As shown in Table 37, magnetic tapes which did not receive a ligand in their backcoats suffered great level-downs in output, and caused a magnetic head to develop burnt matters on its surface. By contrast, the magnetic tapes which received ligands in their backcoats did not suffer level-downs, and caused no accumulation of burnt matters on the surface of a magnetic head.

A magnetic head which was used for recording/replay from a magnetic tape which received a ligand in its backcoat was submitted to electron microscopy, and a schematic diagram was reconstructed from photomicrographs. The diagram give a similar image to that in FIG. 2. A magnetic head which was used for recording/replay from a magnetic tape which did not receive any ligand in its backcoat was submitted to electron microscopy, and a schematic diagram was reconstructed from photomicrographs. The diagram give a similar image to that in FIG. 3.

From above results it was demonstrated that a tape which receives a ligand or a diketone compound in its backcoat comes to prevent the development of burnt matters on the magnetic head upon which it has run past.

<Experiment 12>

In this experiment, an antiseize agent containing a titanate coupling agent was added, together with one of above ligands, into a so-called coated magnetic layer, to produce a magnetic tape.

To be more specific, firstly, a composition was prepared as follows:

Ferromagnetic iron powder (coercive force being 160 kA/m, saturated magnetism 145 μm²/kg, specific area 51 m²/g, length of long axis 0.08 μm and needle ratio 3): 100 weight parts; Polychlorinated vinyl resin (Nippon Zeon, MR110-TM): 14 weight parts; Polyester polyurethane resin (Toyobo): 3 weight parts; Al₂O₃: 5 weight parts; Titanate coupling agent: 3 weight parts; Stearic acid: 1 weight part; Heptyl stearate: 1 weight part; Methylethylketone: 150 weight parts; and Cyclohexanone: 150 weight parts.

The composition was put into an extruder to be kneaded, and was allowed to disperse in a sand mill for six hours. To the thus obtained paint were added polyisocyanate three weight parts and a ligand by an amount as described in Table 39, to produce a magnetic paint.

The thus obtained magnetic paint was applied onto a polyethylenetelephthalate film with a thickness of 7 μm to give a film with a thickness of 6.5 μm. An orientation treatment was applied to the thus formed magnetic film through a solenoid coil, and the film was dried, calendered and hardened, to produced a finished magnetic layer.

Another composition was prepared as follows: Carbon black (Asahi, #50): 100 weight parts; Polyesterpolyurethane resin (Nipporun, N-2304): 100 weight parts; Methylethylketone: 500 weight parts; and Toluene: 500 weight parts.

The composition was mixed, kneaded and allowed to disperse into each other, to produce a backcoat paint. The backcoat paint was applied on one surface of a non-magnetic support opposite to the side upon which a magnetic layer had been formed. The resulting coat was dried to produce a backcoat layer.

The sheet which had the magnetic layer formed on one surface and the backcoat on the other was cut into strips with a width of 8 mm, to produce finished magnetic tapes.

The ligands to be added into the magnetic layer were compounds G-10 to G-16 which were represented by Formula 87 in which the substitutable groups $R^{27}$, $R^{28}$ and $R^{29}$ were chosen as indicated in Table 38.

TABLE 38

| Compound | $R^1$ | $R^2$ | $R^3$ |
|---|---|---|---|
| G-10 | $CH_3$ | H | $CH_3$ |
| G-11 | $C_6H_5$ | H | $CH_3$ |
| G-12 | $(CH_3)_3C$ | H | $(CH_3)_3C$ |
| G-13 | $(CH_3)_3C$ | H | $(CH_3)_3C$ |
| G-14 | H | $Ch_3$ | H |
| G-15 | H | $C_3H_7$ | H |
| G-16 | $CH_3$ | $CH_3$ | $CH_3$ |

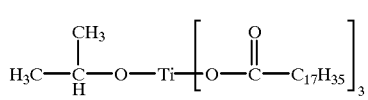

[Formula 94]

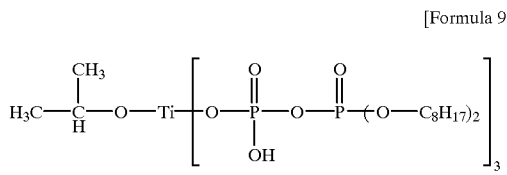

[Formula 95]

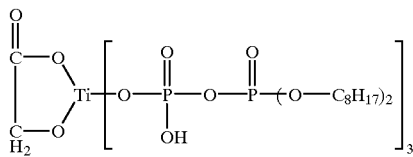

[Formula 96]

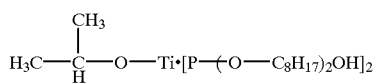

[Formula 97]

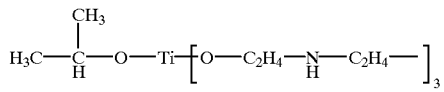

[Formula 98]

Magnetic tapes were prepared in which the above ligands and titanate coupling agents were combined and added into the magnetic layer. Those tapes were placed in cassette shells, made into cartridges, and submitted to a test as in Experiment 7 to check the level-down in output. The results are shown in Table 39. Table 39 also gives the results from a magnetic tape which has received only a titanate coupling agent or from a magnetic tape which received only a ligand.

TABLE 39

| Compound | Addition of ligand (weight parts) | Titanate coupling agent | Level-down (db) |
|---|---|---|---|
| G-10 | 1 | Formula 94 | 0.2 |
| G-10 | 3 | Formula 94 | 1.0 |
| G-10 | 5 | Formula 94 | 0.8 |
| G-10 | 7 | Formula 94 | 0.8 |
| G-10 | 10 | Formula 94 | 0.5 |
| G-10 | 3 | Formula 95 | 0.8 |
| G-10 | 3 | Formula 96 | 0.9 |
| G-10 | 3 | Formula 97 | 1.1 |
| G-10 | 3 | Formula 98 | 1.3 |
| G-11 | 3 | Formula 94 | 1.0 |
| G-12 | 3 | Formula 94 | 1.2 |
| G-13 | 3 | Formula 94 | 1.1 |
| G-14 | 3 | Formula 94 | 1.0 |
| G-15 | 3 | Formula 94 | 0.8 |
| G-16 | 3 | Formula 94 | 0.8 |
| Not added | — | Formula 94 | 6.2 |
| G-10 | 3 | Not added | 4.2 |
| G-10 | 0.05 | Formula 94 | 3.5 |

From the results of evaluation tests it was found that the magnetic tape which had received a combination of ligand and titanate coupling agent in its magnetic layer caused less adherence of burnt matters on the surface of a magnetic head and suffered less level-downs than did the magnetic tape which had received only a ligand or a titanate coupling agent in its magnetic layer, as indicated in Table 39.

As a result of evaluation tests it was found that a tape which receives a combination of a ligand and titanate coupling agent prevents more effectively the development of burnt matters on the magnetic head upon which it has run past than a tape which has received either a ligand or titanate coupling agent in its magnetic layer.

In this experiment, ligand addition was varied widely, and, as shown in Table 39, a magnetic tape which received only 0.05 weight part ligand gave similar results to those from the tape which had not received any ligand.

Level-downs in output are more effectively suppressed as the magnetic tape receives more ligand in its magnetic layer. However, if ligand addition exceeds 100 weight parts, the dispersibility of magnetic powder will be impaired. Thus, ligand addition preferably takes place at 0.3–20 weight parts, or more preferably 0.3–10 weight parts with respect to 100 weight parts of magnetic powder.

In this experiment, titanate coupling agents were also varied, and they were all found to give satisfactory results. Their effects, however, varied more or less among them. This difference may be accounted for by the difference in their adherence to magnetic powder.

In this experiment, we also prepared magnetic tapes in which a titanate coupling agent was applied on the surface of a magnetic layer, instead of being added into the latter. The resulting tape did not give an appreciably effect in the suppression of level-downs. From this it was concluded that the titanate coupling agent is preferably added into the magnetic layer rather than applied on the surface of the latter.

Investigation of Cleaning Tape

In Experiments 13 to 15, we put a compound (ligand) with a pyridine skeleton and two or more ligand sites to cleaning tapes, and studied its effects on the tape performance.

<Experiment 13>

Cleaning tapes were prepared as follows.

To be specific, a composition was prepared which included: Thermoplastic polyurethane resin (average molecular weight being 20,000): 10 weight parts; Copolymer of vinyl chloride and vinyl acetate: 10 weight parts; Carbon (average particle size being 150 nm): 5 weight parts; Ligand: 5 weight parts; and Mixed solvent (methylethylketone/methylisobutylketone/toluene=2:1:1): 220 weight parts.

These ingredients were mixed in a ball mill for 48 hours, three point five parts of a stiffener consisting of polyisocyanate was added, and the resulting mass was further mixed for 30 minutes.

The thus obtained cleaning paint was applied on a polyethylenetelephthalate film with a thickness of 7 $\mu$m to give a film with a thickness of 2 $\mu$m on dryness. Later, the film was dried, and left in an oven maintained at 60° C. for 20 hours to encourage hardening. The resulting sheet was cut into strips with a width of 8 mm to produce finished cleaning tapes.

The ligands (antiseize agents) employed here included above compounds A-1 to A-10 represented by Formula 64, compounds B-1, B-2 and B-10 represented by Formula 64, compounds C-24, C-25 and C-35 represented by Formula 69, and compounds D-23 to D-28, and D-34 and D-35 represented by Formula 70. In addition to above, following ligands were produced:

for the compound B-12, by choosing COOH for the substituting group Y (Y=COO H), n-C3H7 for $R^5$ ($R^5$=n-$C_3H_7$), and H for other substitutable groups (other substitutable groups=H) of Formula 68;

for the compound B-13, by setting Y=OH, $R^5$=F, and other substitutable groups=H of Formula 68;

for the compound B-14, by setting Y=OH, $R^5$=Cl, and other substitutable groups=H of Formula 68;

for the compound B-15, by setting Y=OH, $R^5$=$NH_2$, and other substitutable groups=H of Formula 68;

for the compound B-16, by setting Y=OH, $R^5$=$NO_2$, and other substitutable groups=H of Formula 68;

for the compound B-17, by setting Y=OH, $R^5$=$SO_3H$, and other substitutable groups=H of Formula 68; and for the compound B-18 by setting Y=OH, $R^5$=H, $R^6$=CH, and other substitutable groups=H of Formula 68; and for the compound C-49, by setting $R^{13}$, $R^{16}$=$NH_2$ and other substitutable groups=H of Formula 69; and for the compound C-50, by setting $R^{11}$, $R^{18}$=Cl and other substitutable groups=H of Formula 69; and for the compound D-48, by setting $R^{19}$, $R^{26}$=Cl, and other substitutable groups=H of Formula 70.

Cleaning tapes having above constitutions were placed in cassette shells, made into cartridges, and submitted to following evaluation tests.

As a comparison cleaning tapes which did not have any ligand in their cleaning layers were also submitted to the same evaluation tests.

To be more specific, firstly a videotape recorder similar to that in Experiment 1 was prepared, and used to record signals onto test magnetic tapes for one minute. Then, replay of the same signals was repeated until a level-down as high as 5 dB was obtained. To the same videotape recorder upon which the signal from a tape had reduced by 5 dB, a cleaning tape was applied and allowed to run for one minute. Then, the same magnetic tape was run for replay, and its output was measured, to check how much output was recovered. The recovered output was expressed as a relative value when the initial output of the same tape was taken as 0 dB. The recovered outputs are listed in Tables 40 to 44, together with the compounds representing different ligands added to the cleaning tapes.

TABLE 40

| Compound | Recovery of level-down (dB) |
|---|---|
| A-1 | 4 |
| A-2 | 3 |
| A-3 | 4 |
| A-4 | 3 |
| A-5 | 3 |
| A-6 | 3 |
| A-7 | 3 |
| A-8 | 4 |
| A-9 | 4 |
| A-10 | 3 |

TABLE 41

| Compound | Recovery of level-down (dB) |
|---|---|
| B-1 | 4 |
| B-2 | 3 |
| B-10 | 4 |
| B-12 | 4 |
| B-13 | 4 |
| B-14 | 4 |
| B-15 | 4 |
| B-16 | 4 |
| B-17 | 3 |
| B-18 | 4 |

TABLE 42

| Compound | Recovery of level-down (dB) |
|---|---|
| C-24 | 4 |
| C-25 | 4 |
| C-35 | 3 |
| C-49 | 2 |
| C-50 | 3 |

TABLE 43

| Compound | Recovery of level-down (dB) |
|---|---|
| D-23 | 4 |
| D-24 | 4 |
| D-25 | 3 |
| D-26 | 3 |
| D-27 | 4 |
| D-28 | 4 |
| D-34 | 4 |
| D-35 | 3 |
| D-47 | 3 |

TABLE 44

| Compound | Recovery of level-down (dB) |
|---|---|
| E-1 | 4 |
| E-2 | 4 |
| F-1 | 3 |
| F-3 | 4 |
| F-4 | 4 |
| F-5 | 3 |
| F-6 | 4 |
| Not added | 0 |

As seen from Tables 40 to 44, level-downs recovered more conspicuously when a magnetic tape is set to replay in a videotape recorder through which a cleaning tape with a ligand in its cleaning layer has just run than after the run of a cleaning tape having no ligand added or applied.

<Experiment 14>

Cleaning tapes were prepared in the same manner as in Experiment 13 except that ligands, instead of being added into the cleaning layer, were dissolved in solvents and the solution was coated on the surface of cleaning layer by dipping. The kinds of ligands which were made into solutions were the same as in Experiment 13, and the concentration of solutions was determined as 10 mM. The solvent was a mixture of toluene and alcohol.

Cleaning tapes having above constitutions were placed in cassette shells, made into cartridges, and submitted to the same evaluation test as in Experiment 13. Namely, a magnetic tape was allowed to run through a videotape recorder until a definite degree of level-down developed, a test cleaning tape was allowed to run through the same recorder, and immediately thereafter the same magnetic tape was set to replay on the same recorder and recovery of level-downs was checked. As a comparison, cleaning tapes which had no ligand added or applied were prepared and submitted to the same evaluation test. The results are shown in Tables 45 to 49.

TABLE 45

| Compound | Recovery of level-down (dB) |
|---|---|
| A-1 | 4 |
| A-2 | 4 |
| A-3 | 4 |
| A-4 | 3 |
| A-5 | 3 |
| A-6 | 3 |
| A-7 | 3 |
| A-8 | 4 |
| A-9 | 4 |
| A-10 | 3 |

TABLE 46

| Compound | Recovery of level-down (dB) |
|---|---|
| B-1 | 3 |
| B-2 | 3 |
| B-10 | 4 |
| B-12 | 4 |
| B-13 | 4 |
| B-14 | 3 |
| B-15 | 4 |
| B-16 | 4 |
| B-17 | 4 |
| B-18 | 3 |

TABLE 47

| Compound | Recovery of level-down (dB) |
|---|---|
| C-24 | 4 |
| C-25 | 4 |
| C-35 | 4 |
| C-49 | 3 |
| C-50 | 3 |

TABLE 48

| Compound | Recovery of level-down (dB) |
|---|---|
| D-23 | 4 |
| D-24 | 4 |
| D-25 | 3 |
| D-26 | 3 |
| D-27 | 3 |
| D-28 | 4 |
| D-34 | 3 |
| D-35 | 3 |
| D-47 | 4 |

TABLE 49

| Compound | Recovery of level-down (dB) |
|---|---|
| E-1 | 3 |
| E-2 | 3 |
| F-1 | 3 |
| F-3 | 3 |
| F-4 | 3 |
| F-5 | 4 |
| F-6 | 3 |
| Not added | 0 |

As seen from Tables 45 to 49, level-downs recovered more conspicuously when a magnetic tape is set to replay in a videotape recorder through which a cleaning tape with a ligand in its cleaning layer has just run than after the run of a cleaning tape having no ligand added or applied.

<Experiment 15>

A ligand was dissolved at a concentration of 10 mM in a mixed solution of toluene and alcohol. On the other hand, unwoven cloth made of propylene (Dexter, grade 193) was cut into strips with a width of 8 mm, each of which was applied by dipping the solution containing a ligand to produce a cleaning tape.

Cleaning tapes having above constitutions were placed in cassette shells, made into cartridges, and submitted to the same evaluation test as in Experiment 1 3. Namely, a magnetic tape was allowed to run through a videotape recorder until a definite degree of level-down developed, a test cleaning tape was allowed to run through the same recorder, and immediately thereafter the same magnetic tape was set to replay on the same recorder and recovery of level-downs was checked. The results are listed in Tables 50 to 54, together with the compounds representing different ligands added to the cleaning tapes.

TABLE 50

| Compound | Recovery of level-down (dB) |
|---|---|
| A-1 | 4 |
| A-2 | 3 |
| A-3 | 4 |
| A-4 | 4 |
| A-5 | 4 |
| A-6 | 3 |
| A-7 | 4 |
| A-8 | 5 |
| A-9 | 5 |
| A-10 | 3 |

TABLE 51

| Compound | Recovery of level-down (dB) |
|---|---|
| B-1 | 4 |
| B-2 | 4 |
| B-10 | 4 |
| B-12 | 4 |
| B-13 | 4 |
| B-14 | 3 |
| B-15 | 4 |
| B-16 | 4 |
| B-17 | 4 |
| B-18 | 3 |

TABLE 52

| Compound | Recovery of level-down (dB) |
|---|---|
| C-24 | 4 |
| C-25 | 4 |
| C-35 | 4 |
| C-49 | 4 |
| C-50 | 4 |

TABLE 53

| Compound | Recovery of level-down (dB) |
|---|---|
| D-23 | 4 |
| D-24 | 4 |
| D-25 | 4 |
| D-26 | 3 |
| D-27 | 4 |
| D-28 | 4 |
| D-34 | 3 |
| D-35 | 4 |
| D-47 | 3 |

TABLE 54

| Compound | Recovery of level-down (dB) |
|---|---|
| E-1 | 4 |
| E-2 | 4 |
| F-1 | 4 |
| F-3 | 3 |
| F-4 | 3 |
| F-5 | 4 |
| F-6 | 4 |
| Not added | 0 |

As seen from Tables 50 to 54, the level-down recovered greatly when a magnetic tape is set to replay in a videotape recorder through which a cleaning tape with a ligand immersed therein has just run.

From the results of Experiments 13 to 15, it was demonstrated that a compound having a pyridine skeleton and two or more ligand sites or a ligand is suitable as a cleaning agent when added into a cleaning tape. This ligand, whether being applied on the surface of the non-magnetic support or on the surface of the cleaning layer, or added into the cleaning layer of a cleaning tape, is effective in cleaning the magnetic head which the tape has run past.

Investigation of Cleaning Tape 2

In Experiments 16 to 18, we put diketone compounds (ligand) to cleaning tapes, and studied their effects on the tape performance.

<Experiment 16>

Cleaning tapes were prepared as follows.

To be specific, a composition was prepared which included: Thermoplastic polyurethane resin (average molecular weight being 20,000): 10 weight parts; Copolymer of vinyl chloride and vinyl acetate: 10 weight parts; Carbon (average particle size being 150 nm): 5 weight parts; Ligand: 5 weight parts; and Mixed solvent (methylethylketone/methylisobutylketone/toluene=2:1:1): 220 weight parts.

These ingredients were mixed in a ball mill for 48 hours, three point five parts of a stiffener consisting of polyisocyanate was added, and the resulting mass was further mixed for 30 minutes.

The thus obtained cleaning paint was applied on a polyethylenetelephthalate film with a thickness of 7 μm to give a film with a thickness of 2 μm on dryness. Later, the film was dried, and left in an oven maintained at 60° C. for 20 hours to encourage hardening. The resulting sheet was cut into strips with a width of 8 mm to produce finished cleaning tapes.

The ligands employed here were compound H-1 represented by Formula 86, and compounds G-1 to G-9 represented by Formula 87 which were described above in regard to the evaluation tests of magnetic recording media.

The cleaning tapes having above constitutions were placed in cassette shells, made into cartridges, and submitted a following evaluation test.

As a comparison, cleaning tapes which had no ligand added were prepared and submitted to the same evaluation test.

Namely, a magnetic tape was allowed to run through the same videotape recorder as used in Experiment 7 for 20 minutes to record signals, and then replay of the signals was repeated until a 20 dB level-down was obtained. A test cleaning tape was allowed to run through the same recorder for one minute, and immediately thereafter the same magnetic tape was set on the same recorder to replay the same signals and recovery of level-downs was checked. The results are listed in Tables 50 to 54, together with the compounds representing different ligands added to the cleaning tapes. The recovered output was expressed as a relative value when the initial output of the same tape was taken as 0 dB. The recovered outputs are listed in Table 55 in connection with the compounds representing different ligands added to the cleaning tapes.

TABLE 55

| Compound | Recovery of level-down (dB) |
| --- | --- |
| G-1 | 4 |
| G-2 | 4 |
| G-3 | 4 |
| G-4 | 4 |
| G-5 | 3 |
| G-6 | 4 |
| G-7 | 4 |
| G-8 | 4 |
| G-9 | 3 |
| H-1 | 4 |
| Not applied | 0 |

As seen from Table 55, level-downs recovered more conspicuously when a magnetic tape is set to replay in a videotape recorder through which a cleaning tape with a ligand in its cleaning layer has just run than after the run of a cleaning tape having no ligand added or applied.

<Experiment 17>

Cleaning tapes were prepared in the same manner as in Experiment 16 except that ligands, instead of being added into the cleaning layer, were dissolved in solvents and the solution was coated on the surface of cleaning layer by dipping. The ligands which were made into solutions were the same as in Experiment 16, and the concentration of solutions was determined as 10 mM. The solvent was a mixture of toluene and alcohol.

Cleaning tapes having above constitutions were placed in cassette shells, made into cartridges, and submitted to the same evaluation test as in Experiment 16. Namely, a magnetic tape was allowed to run through a videotape recorder until a definite degree of level-down developed, a test cleaning tape was allowed to run through the same recorder, and immediately thereafter the same magnetic tape was set to replay on the same recorder and recovery of level-downs was checked. As a comparison, cleaning tapes which had no ligand added or applied were prepared and submitted to the same evaluation test. The results are listed in Table 56 in connection with the compounds representing different ligand s applied to the cleaning tapes.

TABLE 56

| Compound | Recovery of level-down (dB) |
| --- | --- |
| G-1 | 4 |
| G-2 | 4 |
| G-3 | 3 |
| G-4 | 4 |
| G-5 | 3 |
| G-6 | 4 |
| G-7 | 4 |
| G-8 | 4 |
| G-9 | 3 |
| H-1 | 4 |
| Not applied | 0 |

As seen from Table 56, level-downs recovered more conspicuously when a magnetic tape is set to replay in a videotape recorder through which a cleaning tape with a ligand in its cleaning layer has just run than after the run of a cleaning tape having no ligand added or applied.

<Experiment 18>

A ligand was dissolved at a concentration of 10 mM in a mixed solution of toluene and alcohol. On the other hand, unwoven cloth made of propylene (Dexter, grade 193) was cut into strips with a width of 8 mm, onto each of which was applied by dipping the solution containing a ligand to produce a cleaning tape.

Cleaning tapes having above constitutions were placed in cassette shells, made into cartridges, and submitted to the same evaluation test as in Experiment 1 6. Namely, a magnetic tape was allowed to run through a videotape recorder until a definite degree of level-down developed, a test cleaning tape was allowed to run through the same recorder, and immediately thereafter the same magnetic tape was set to replay on the same recorder and recovery of level-downs was checked. The results are listed in Table 57 in connection with the compounds representing different ligands applied to the cleaning tapes.

TABLE 57

| Compound | Recovery of level-down (dB) |
|---|---|
| G-1 | 4 |
| G-2 | 4 |
| G-3 | 3 |
| G-4 | 4 |
| G-5 | 3 |
| G-6 | 4 |
| G-7 | 4 |
| G-8 | 4 |
| G-9 | 3 |
| H-1 | 3 |
| Not applied | 0 |

As seen from Table 57, it was found that level-downs recover greatly when a magnetic tape, after having undergone a considerable level-down in its output, is set to replay in the same videotape recorder through which a cleaning tape composed of unwoven textile soaked with a ligand has just run.

From the results of Experiments 16 to 18 it was demonstrated that diketone compounds (ligands) are suitable as a cleaning agent when added into a cleaning tape. This ligand, whether being applied on the surface of the support or on the surface of the cleaning layer, or added into the cleaning layer of a cleaning tape, is effective in cleaning the magnetic head of the recorder upon which the tape has run past.

What is claimed is:

1. A magnetic recording medium comprising:

a non-magnetic substrate, a magnetic recording layer comprising a ferromagnetic thin film and a carbon film formed thereon, and a thin layer formed on the carbon film, the thin layer comprising a compound with a pyridine skeleton and two or more ligand sites, the compound being selected from the group consisting of:

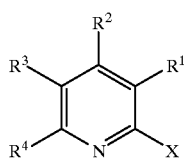

Formula 1 wherein $R^1$–$R^4$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form together an aromatic ring, and wherein X is selected from the group consisting of hydroxime, Schiff base, ester, carboxylic acid, alcohol, amine, amide, imide and polar groups comprising heterocyclic aromatic compounds;

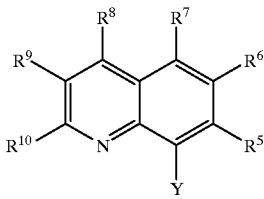

Formula 2 wherein $R^5$–$R^{10}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring, and Y is selected from the group consisting of OH, SH and $NH_2$;

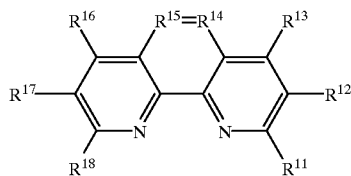

Formula 3 wherein $R^{11}$–$R^{18}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and

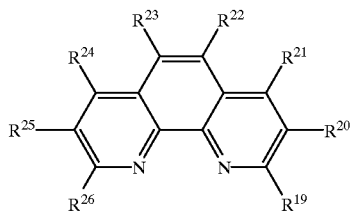

Formula 4 wherein $R^{19}$–$R^{26}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and wherein said compound exists in a free state and is not bound to the magnetic recording layer.

2. A magnetic recording medium according to claim 1 wherein the magnetic layer further comprises carboxylic acid.

3. A magnetic recording medium according to claim 1 wherein a backcoat comprising said compound is formed on one surface of the non-magnetic substrate opposite the magnetic recording layer.

4. A magnetic recording medium comprising:

a non-magnetic substrate, a magnetic recording layer comprising a ferromagnetic thin film and a carbon film formed thereon, and a first layer formed on the carbon film, the first layer comprising a titanate coupling agent or a carboxyl acid, and a second layer formed on the first layer, the second layer comprising a compound with a pyridine skeleton and two or more ligand sites, the compound being selected from the group consisting of:

Formula 1

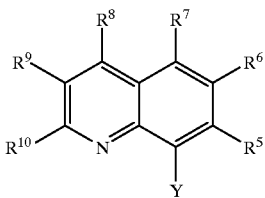

wherein $R^1$–$R^4$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form together an aromatic ring, and wherein X is selected from the group consisting of hydroxime, Schiff base, ester, carboxylic acid, alcohol, amine, amide, imide and polar groups comprising heterocyclic aromatic compounds;

Formula 2

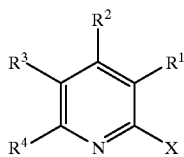

wherein $R^5$–$R^{10}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring, and Y is selected from the group consisting of OH, SH and $NH_2$;

Formula 3

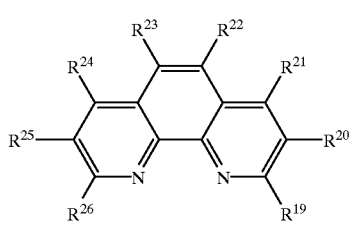

wherein $R^{11}$–$R^{18}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and Formula 4

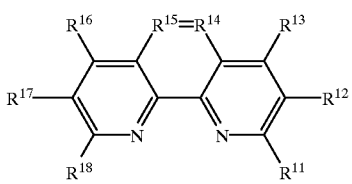

wherein $R^{19}$–$R^{26}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and wherein said compound exists in a free state and is not bound to the magnetic recording layer.

5. A magnetic recording medium according to claim 4 wherein the titanate coupling agent comprises at least one group selected from the group consisting of amino group, phosphate ester group, carboxylic acid ester group, acyl group, hydroxyl group, carbonyl group, and alkyl group.

6. A magnetic recording medium according to claim 4 wherein the magnetic layer further comprises carboxylic acid.

7. A magnetic recording medium according to claim 4 wherein a backcoat comprising said compound is formed on one surface of the non-magnetic substrate opposite the magnetic recording layer.

8. A magnetic recording medium comprising:

a non-magnetic substrate, and a magnetic recording layer comprising ferromagnetic particles and a binder, said magnetic recording layer comprising a carboxylic acid which adsorbs said ferromagnetic particles and a compound comprising a pyridine skeleton and two or more ligand sites, the compound being selected from the group consisting of:

Formula 1

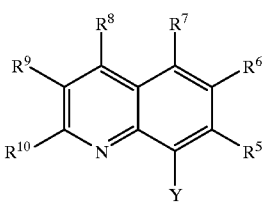

wherein $R^1$–$R^4$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form together an aromatic ring, and wherein X is selected from the group consisting of hydroxime, Schiff base, ester, carboxylic acid, alcohol, amine, amide, imide and polar groups comprising heterocyclic aromatic compounds;

Formula 1

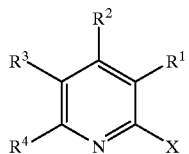

wherein $R^1$–$R^4$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form together an aromatic ring, and wherein X is selected from the group consisting of hydroxime, Schiff base, ester, carboxylic acid, alcohol, amine, amide, imide and polar groups comprising heterocyclic aromatic compounds;

Formula 2

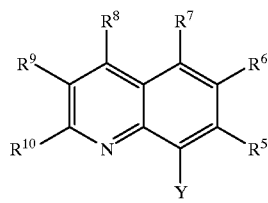

wherein $R^5$–$R^{10}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring, and Y is selected from the group consisting of OH, SH and $NH_2$;

Formula 3

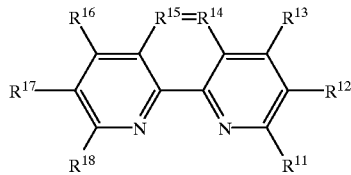

wherein $R^{11}$–$R^{18}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and Formula 4

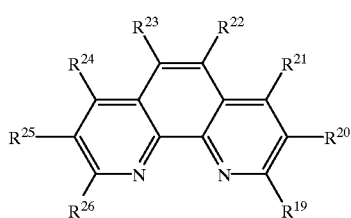

Formula 2

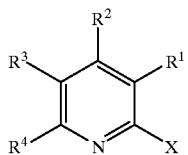

wherein $R^5$–$R^{10}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring, and Y is selected from the group consisting of OH, SH and $NH_2$;

Formula 3

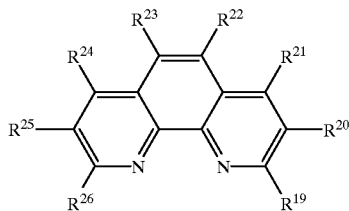

wherein $R^{11}$–$R^{18}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and Formula 4

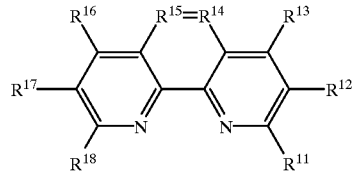

wherein $R^{19}$–$R^{26}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and
  wherein said compound exists in a free state and is not bound to the magnetic recording layer.

9. A magnetic recording medium according to claim 8 wherein the magnetic layer further comprises carboxylic acid.

10. A magnetic recording medium according to claim 8 wherein a backcoat comprising said compound is formed on one surface of the non-magnetic substrate opposite the magnetic recording layer.

11. A magnetic recording medium comprising:
  a non-magnetic substrate, and
  a magnetic recording layer comprising ferromagnetic particles and a binder, said magnetic recording layer comprising a titanate coupling agent which adsorbs said ferromagnetic particles and a compound comprising a pyridine skeleton and two or more ligand sites, the compound being selected from the group consisting of:

wherein $R^{19}$–$R^{26}$ are selected from the group consisting of hydrogen, a halogen atom, and hydroxyl, nitro, carboxyl, carbonyl, amino, amide, and sulfonate groups, and alkyl, aryl and heterocyclic aromatic groups which have been substituted with the foregoing groups, and wherein any pair of two adjacent groups can form an aromatic ring; and wherein said compound exists in a free state and is not bound to the magnetic recording layer.

12. A magnetic recording medium according to claim 11 wherein the magnetic layer further comprises carboxylic acid.

13. A magnetic recording medium according to claim 11 wherein a backcoat comprising said compound is formed on one surface of the non-magnetic substrate opposite the magnetic recording layer.

14. A magnetic recording medium according to claim 11 wherein the titanate coupling agent comprises at least one group selected from the group consisting of amino group, phosphate ester group, carboxylic acid ester group, acyl group, hydroxyl group, carbonyl group, and alkyl group.

* * * * *